United States Patent
Otsuka

(10) Patent No.: US 11,400,800 B2
(45) Date of Patent: Aug. 2, 2022

(54) STRUCTURAL MEMBER FOR AUTOMOBILES

(71) Applicant: NIPPON STEEL CORPORATION, Tokyo (JP)

(72) Inventor: Kenichiro Otsuka, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 78 days.

(21) Appl. No.: 16/494,915

(22) PCT Filed: Apr. 10, 2018

(86) PCT No.: PCT/JP2018/014983
§ 371 (c)(1),
(2) Date: Sep. 17, 2019

(87) PCT Pub. No.: WO2018/190312
PCT Pub. Date: Oct. 18, 2018

(65) Prior Publication Data
US 2020/0031208 A1 Jan. 30, 2020

(30) Foreign Application Priority Data
Apr. 10, 2017 (JP) .............................. JP2017-077290

(51) Int. Cl.
*B60J 5/00* (2006.01)
*B60R 19/04* (2006.01)
(Continued)

(52) U.S. Cl.
CPC ................. *B60J 5/00* (2013.01); *B60R 19/04* (2013.01); *E04C 5/06* (2013.01);
(Continued)

(58) Field of Classification Search
CPC .... E04C 5/06; B60J 5/00; B60R 19/04; B60R 2019/1813; B62D 21/00; B62D 25/00;
(Continued)

(56) References Cited

U.S. PATENT DOCUMENTS 1,071,565 A * 8/1913 Morgner .................... E06B 9/52
49/440
1,433,232 A * 10/1922 Hawke ....................... E04C 5/06
52/443
(Continued)

FOREIGN PATENT DOCUMENTS

DE 202007016333 U1 * 4/2008 ............ B60J 1/2038
DE 10 2015 218 454 A1 3/2017
(Continued)

OTHER PUBLICATIONS

International Preliminary Report on Patentability and English translation of the Written Opinion of the International Searching Authority (Forms PCT/IB/373 and PCT/ISA/237) for International Application No. PCT/JP2018/014983, dated Oct. 15, 2019.
(Continued)

*Primary Examiner* — Brian D Mattei
*Assistant Examiner* — Joseph J. Sadlon
(74) *Attorney, Agent, or Firm* — Birch, Stewart, Kolasch & Birch, LLP

(57) ABSTRACT

A structural member for an automobile to be disclosed includes a press-formed product formed from one steel sheet and a reinforcing member fixed to the press-formed product. The press-formed product includes two vertical wall portions and a top plate portion linking the two vertical wall portions. The reinforcing member is a member which has an L-shaped cross section and includes a first plate-like portion and a second plate-like portion. The first plate-like portion is fixed to one of the vertical wall portions such that the second
(Continued)

plate-like portion protrudes toward an outward direction from the vertical wall portion side along the top plate portion.

11 Claims, 18 Drawing Sheets

(51) Int. Cl.
*E04C 5/06* (2006.01)
*B60R 19/18* (2006.01)
*B62D 25/04* (2006.01)
*B62D 25/06* (2006.01)
*B62D 25/20* (2006.01)

(52) U.S. Cl.
CPC ...... *B60R 2019/1813* (2013.01); *B62D 25/04* (2013.01); *B62D 25/06* (2013.01); *B62D 25/20* (2013.01)

(58) Field of Classification Search
CPC ...... B62D 25/025; B62D 25/04; B62D 25/06; B62D 25/20
USPC .......................................................... 52/846
See application file for complete search history.

(56) References Cited

U.S. PATENT DOCUMENTS

| | | | | |
|---|---|---|---|---|
| 3,324,616 A * | 6/1967 | Brown | B62D 25/2054 | 52/377 |
| 3,373,534 A * | 3/1968 | Berridge | E04D 3/362 | 52/550 |
| 3,819,228 A * | 6/1974 | Cornacchia | B60J 5/0458 | 296/146.9 |
| 3,834,105 A * | 9/1974 | Powers | E04B 5/10 | 52/377 |
| 4,424,652 A * | 1/1984 | Turner | E04B 1/10 | 52/204.2 |
| 4,441,294 A * | 4/1984 | Riley | E04D 13/16 | 52/404.3 |
| 4,486,985 A * | 12/1984 | Kagitani | B60J 10/30 | 52/716.5 |
| 4,512,835 A * | 4/1985 | Gardiner | B29C 69/003 | 156/174 |
| 4,514,008 A * | 4/1985 | Watanabe | B60K 15/073 | 280/835 |
| 5,056,861 A * | 10/1991 | Garnweidner | B60J 5/0444 | 296/187.12 |
| 5,259,660 A | 11/1993 | Haesters | | |
| 5,471,810 A * | 12/1995 | Sugisawa | E04C 3/04 | 52/167.3 |
| 5,567,005 A * | 10/1996 | Kosuge | B62D 21/02 | 296/204 |
| 5,981,082 A * | 11/1999 | Pirchl | F16L 59/07 | 228/59 |
| 6,179,355 B1 * | 1/2001 | Chou | B60R 19/18 | 188/377 |
| 6,296,287 B1 * | 10/2001 | Kinbara | B60R 19/18 | 293/120 |
| 6,325,431 B1 * | 12/2001 | Ito | B60R 19/18 | 293/102 |
| 6,360,510 B1 * | 3/2002 | Woodrum | E04B 2/62 | 52/36.2 |
| 6,389,697 B1 * | 5/2002 | Benoit | B21D 26/14 | 29/897.2 |
| 6,854,397 B2 * | 2/2005 | Terajima | B65G 21/06 | 104/95 |
| 6,869,136 B2 * | 3/2005 | Igarashi | B62D 27/023 | 296/204 |
| 7,017,319 B2 * | 3/2006 | Bowman | E04F 13/00 | 52/204.1 |
| 7,070,228 B2 * | 7/2006 | Shimizu | B62D 25/082 | 296/187.01 |
| 7,243,983 B2 * | 7/2007 | Rashidy | B60J 7/126 | 296/107.09 |
| 7,534,501 B2 * | 5/2009 | Durney | E04C 3/34 | 428/596 |
| 8,087,706 B2 * | 1/2012 | Karlander | B60R 19/18 | 293/102 |
| 8,176,696 B2 * | 5/2012 | LeBlang | E04B 1/165 | 52/309.12 |
| 8,181,423 B2 * | 5/2012 | Bartlett | E04B 5/10 | 52/836 |
| 8,307,610 B2 * | 11/2012 | Landers | E04B 2/7412 | 52/846 |
| 8,407,966 B2 * | 4/2013 | Strickland | E04B 5/40 | 52/837 |
| 8,505,851 B2 * | 8/2013 | Noebel | B64C 1/064 | 244/158.1 |
| 8,662,575 B2 * | 3/2014 | Tamura | B62D 25/04 | 296/209 |
| 8,668,248 B2 * | 3/2014 | Ishizono | B62D 25/025 | 296/187.08 |
| 8,782,993 B2 * | 7/2014 | Lawley | E04B 5/12 | 52/655.1 |
| 8,857,133 B2 * | 10/2014 | Powers, III | F24S 25/35 | 52/846 |
| 8,857,852 B2 * | 10/2014 | Yamamoto | B62D 21/02 | 280/781 |
| 8,905,118 B2 * | 12/2014 | Charest | B22D 19/00 | 164/111 |
| 9,004,342 B2 * | 4/2015 | Gallagher, Jr. | C22C 38/14 | 228/173.6 |
| 9,017,798 B2 * | 4/2015 | Hashimoto | E04B 7/06 | 428/174 |
| 9,884,597 B2 * | 2/2018 | Matecki | B60R 19/18 | |
| 9,975,506 B2 * | 5/2018 | Handing | B60R 19/023 | |
| 10,479,429 B2 * | 11/2019 | Kamiya | B60R 19/04 | |
| 10,507,873 B2 * | 12/2019 | Teshima | B60R 19/02 | |
| 10,857,858 B2 * | 12/2020 | Otsuka | B21D 22/208 | |
| 10,974,780 B2 * | 4/2021 | Schneider | B21D 47/01 | |
| 2008/0296433 A1 * | 12/2008 | Brenner | B64C 1/12 | 244/129.1 |
| 2010/0043348 A1 * | 2/2010 | Houghton | E04B 1/24 | 52/846 |
| 2013/0032065 A1 * | 2/2013 | Le Monnier | B65D 19/0028 | 108/51.3 |
| 2014/0147693 A1 | 5/2014 | Yasuyama et al. | | |
| 2015/0307045 A1 * | 10/2015 | Matecki | B60R 19/023 | 52/843 |
| 2015/0354215 A1 * | 12/2015 | Winter | E04B 1/24 | 52/846 |
| 2016/0016610 A1 | 1/2016 | Okada et al. | | |
| 2016/0362141 A1 | 12/2016 | Hasegawa | | |

FOREIGN PATENT DOCUMENTS

| | | |
|---|---|---|
| JP | 2011-67841 A | 4/2011 |
| JP | 2011-178327 A | 9/2011 |
| JP | 2011-207264 A | 10/2011 |
| JP | 2013-103528 A | 5/2013 |
| JP | 2013-189173 A | 9/2013 |
| JP | 2014-87848 A | 5/2014 |
| JP | 2017-1521 A | 1/2017 |

OTHER PUBLICATIONS

International Search Report for PCT/JP2018/014983 dated Jun. 26, 2018.
Written Opinion of the International Searching Authority for PCT/JP2018/014983 (PCT/ISA/237) dated Jun. 26, 2018.

* cited by examiner

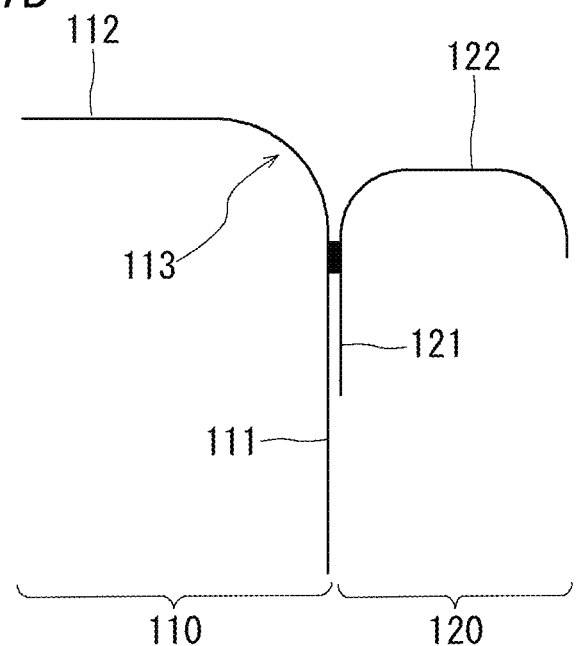
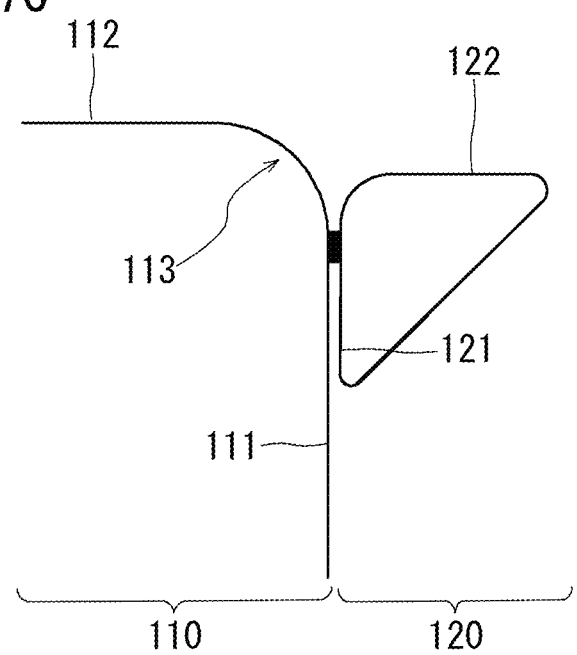

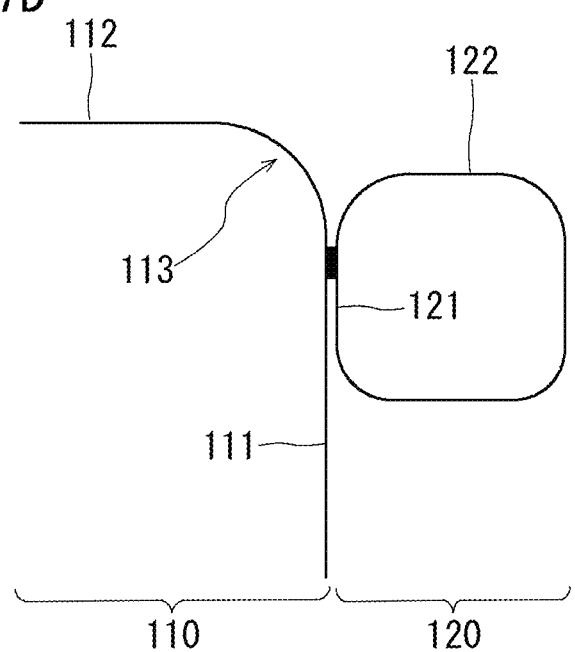

Sample 3

Sample 1

Sample 2

Sample 4

STRUCTURAL MEMBER FOR AUTOMOBILES

TECHNICAL FIELD

The present invention relates to a structural member for an automobile.

BACKGROUND ART

A body of an automobile is made up of various structural members. Many of the structural members are formed by press forming a steel sheet. In order to improve collision safety performance, various proposals have been made regarding structural members (especially, long-sized members) of automobiles.

For example, Patent Literature 1 (Japanese Patent Application Publication No. 2011-178327), Patent Literature 2 (Japanese Patent Application Publication No. 2013-189173), Patent Literature 3 (Japanese Patent Application Publication No. 2014-087848), and Patent Literature 4 (Japanese Patent Application Publication No. 2011-067841) each disclose techniques for reinforcing a structural member for use in automobiles.

Patent Literature 1 discloses a frame structure including a tubular frame body. A reinforcing member is attached to the inner side of a corner portion of the frame body.

Patent Literature 2 discloses a structural member including a first formed body and a second formed body (reinforcing member). The first formed body has a hat-shaped cross-sectional shape and the second formed body has a grooved cross-sectional shape. Patent Literature 2 discloses a structural member in which the second formed body (reinforcing member) is joined to an inner surface or outer surface of the first formed body.

Patent Literature 3 discloses a formed member having a ridge portion linking one plane with another plane. A reinforcing member is joined to the ridge portion. Patent Literature 3 discloses a reinforcing member which has a similar shape as that of the ridge portion.

Patent Literature 4 discloses a structural member in which a hollow cross section is formed by a top wall portion, vertical wall portions respectively linked with both ends of the top wall portion, and a bottom wall portion. A bulging portion bulging outward is provided in a connection region between the top wall portion and the vertical wall portion.

CITATION LIST

Patent Literature

Patent Literature 1: Japanese Patent Application Publication No. 2011-178327
Patent Literature 2: Japanese Patent Application Publication No. 2013-189173
Patent Literature 3: Japanese Patent Application Publication No. 2014-087848
Patent Literature 4: Japanese Patent Application Publication No. 2011-067841

SUMMARY OF INVENTION

Technical Problem

Using a structural member having high properties in a three-point bending test enables improvement of collision safety performance of an automobile and reduction of the weight thereof. Therefore, there is a need for new structural members having high properties in a three-point bending test. Under such circumstances, an object of the present invention is to provide a structural member having high properties in a three-point bending test.

Solution to Problem

A structural member according to an embodiment of the present invention is a structural member for an automobile. This structural member includes a press-formed product formed from one steel sheet and a reinforcing member fixed to the press-formed product. The press-formed product includes two vertical wall portions and a top plate portion linking the two vertical wall portions. The reinforcing member is a member which has an L-shaped cross section and includes a first plate-like portion and a second plate-like portion. The first plate-like portion is fixed to one of the vertical wall portions such that the second plate-like portion protrudes toward an outward direction from a side of the vertical wall portion along the top plate portion.

Advantageous Effects of Invention

According to the present invention, it is possible to achieve a structural member having high properties in a three-point bending test. Using the structural member according to the present invention enables improvement of collision safety performance of an automobile and reduction of the weight thereof.

BRIEF DESCRIPTION OF DRAWINGS

FIG. 7B is a cross-sectional view of a reinforcing member of the present embodiment when its cross-sectional shape is a U-shape.

FIG. 7C is a cross-sectional view of a reinforcing member of the present embodiment when its cross-sectional shape is a triangle shape.

FIG. 7D is a cross-sectional view of a reinforcing member of the present embodiment when its cross-sectional shape is a rectangle shape.

DESCRIPTION OF EMBODIMENTS

Figure 1:
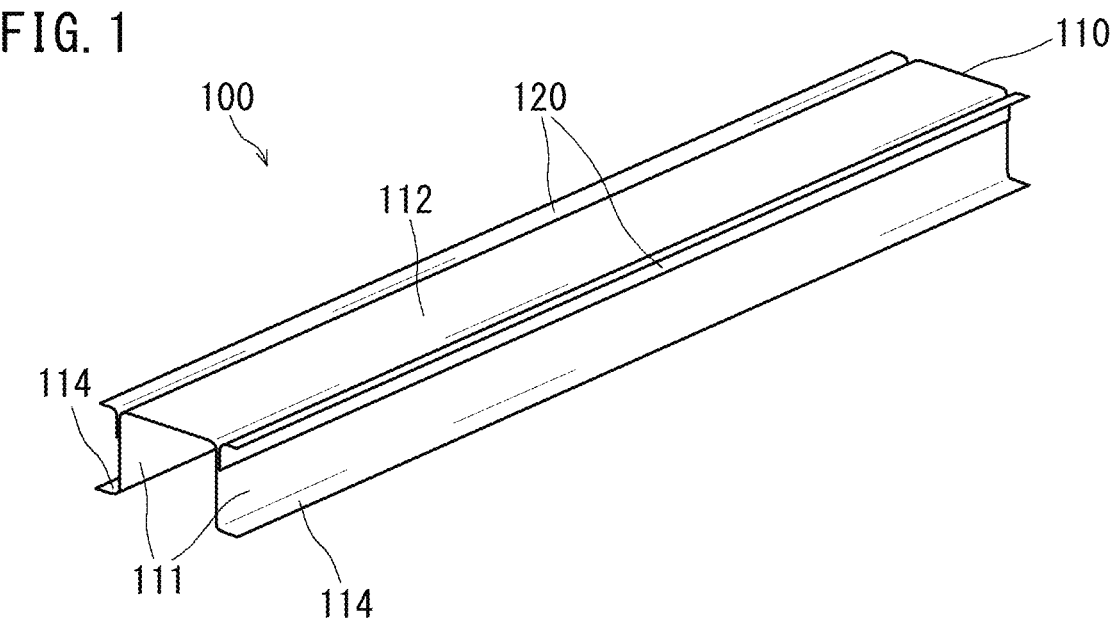
FIG. 1 is a perspective view to schematically show an example of a structural member of a present embodiment.

After having conducted diligent study, the present inventor has newly found that properties in a three-point bending test are improved by a specific structure. The present invention has been made based on this new finding.

Hereinafter, embodiments of the present invention will be described. Note that in the following description, while embodiments of the present invention will be described by way of examples, the present invention will not be limited to the examples to be described below. Although specific numerical values and materials may be illustrated by examples in the following description, other numerical values and materials may be applied provided that effects of the present invention can be achieved. The term "cross section" as used herein refers to, unless otherwise stated, a cross section perpendicular to a direction in which a press-formed product (P) extends (longitudinal direction).

(Structural Member for Automobile)

The structural member of the present embodiment is a structural member for an automobile. This structural member includes a press-formed product formed from one steel sheet, and a reinforcing member fixed to the press-formed product. These press-formed product and reinforcing member may also be referred to as a "press-formed product (P)" and a "reinforcing member (R)", respectively. Further, the structural member of the present embodiment may also be referred to as a "structural member (S)".

The press-formed product (P) includes two vertical wall portions, and a top plate portion linking the two vertical wall portions. The reinforcing member (R) is a member which has an L-shaped cross section and includes a first plate-like portion and a second plate-like portion. The first plate-like portion is fixed to one of the vertical wall portions such that the second plate-like portion protrudes toward an outward direction from a side of the vertical wall portion along the top plate portion.

The press-formed product (P) can be formed by deforming one steel sheet (blank steel sheet). The cross section of the press-formed product (P) may include a U-shaped portion whose bottom portion is substantially flat. When the press-formed product (P) includes flange portions to be described below, its cross section may be substantially hat-shaped.

In viewpoints of collision safety and weight reduction, the steel sheet constituting the press-formed product (P) preferably has a high tensile strength. The tensile strength of the steel sheet may be not less than 340 MPa (for example, not less than 490 MPa, not less than 590 MPa, not less than 780 MPa, not less than 980 MPa, or not less than 1200 MPa). There is no upper limit of tensile strength, it may be not more than 2000 MPa.

Commonly, the press-formed product (P) has a generally elongated shape. Any of the vertical wall portions, the top plate portion, and the flange portions to be described below extends along the longitudinal direction of the press-formed product (P). The reinforcing member (R) may be disposed over the entire press-formed product (P) in the longitudinal direction, or may be disposed over only a part of the press-formed product (P) in the longitudinal direction.

Hereinafter, a region surrounded by the two vertical wall portions, a virtual plane linking the ends of the two vertical wall portions, and the top plate portion may be referred to as an "inside of press-formed product (P)". Further, a side opposite to the inside across the vertical wall portions and the top plate portion may be referred to as an "outside of press-formed product (P)". Furthermore, a direction away from the inside of press-formed product (P) may be referred to as an "outward direction".

The top plate portion connects the two vertical wall portions. To be more specific, the vertical wall portion and the top plate portion are continuous via the ridge portion (corner portion). In another aspect, the top plate portion is a lateral wall portion that connects the two vertical wall portions. For that reason, in this specification, the top plate portion can be replaced with the lateral wall portion. When the press-formed product (P) is disposed with the lateral wall portion (top plate portion) facing downward, the lateral wall portion can be called as a bottom plate portion. However, in this specification, the lateral wall portion is referred to as the top plate portion with reference to the case in which the lateral wall portion is disposed upward.

Angles Y formed by the top plate portion and each of the vertical wall portions are generally 90° or the vicinity thereof Although the angles Y may be less than 90°, they are generally not less than 90°, and may be in a range of 90° to 150°. The two angles Y may be different from each other, or substantially equal to each other (difference between the both is not more than 10°). The angles Y will be described in FIG. 3.

The first plate-like portion is fixed to the press-formed product (P) such that the side thereof which is linked to the second plate-like portion is disposed upward (on the top plate portion side). There is no limitation on the way in which the first plate-like portion of the reinforcing member (R) is fixed to the press-formed product (P), and the fixing method may be selected depending on the circumstances. The first plate-like portion may be fixed to the press-formed product (P) by at least one kind selected from the group consisting of welding, adhesive bonding, brazing, riveting, and friction stir joining. Examples of welding include resistance spot welding and laser welding. The shape, range, and number of the fixing portion may be appropriately selected depending on the circumstances. Regarding the position of the fixing portion, it is preferably as close to the top plate portion as possible. This is because as a result of fixing at a position close to the top plate portion, a moment, by which the first plate-like portion inwardly presses the vertical wall portion of the press-formed product, becomes more likely to occur. When a portion of the first plate-like portion abutting on the vertical wall portion of the press-formed product is denoted as a plane C, it is preferable that the center position of the fixing portion is located in a half-plane of the plane C on the side close to the second plate-like portion. Note that regarding the fixing strength, it is sufficient if the joined portion will not be torn off during collision deformation.

The top plate portion and the second plate-like portion are typically in parallel with each other. However, the second plate-like portion may be inclined with respect to the top plate portion. An angle X formed by the top plate portion and the second plate-like portion may be in a range of 150° to 200°. Hereinafter, this angle may be referred to as an "angle X". The angle X is, for example, not more than 180°. Preferably, the angle X is 150° to 180°. The angle X will be described in FIG. 3.

In the reinforcing member (R), a shape having an L-shaped cross section is constituted by the first plate-like portion and the second plate-like portion. The angle Z formed by the first plate-like portion and the second plate-like portion may be in a range of 70° to 120°. Preferably, the angle Z is 80° to 100°. Note that the angle Z is an angle determined in accordance with the angle X and the angle Y. The angle Z will be described in FIG. 3.

In a cross section of the reinforcing member (R), the corner portion at a boundary between the first plate-like portion and the second plate-like portion is preferably rounded. Forming the corner portion into a rounded shape can suppress plastic deformation due to stress concentration in the corner portion of the reinforcing member at the time of collision. In the cross section of the reinforcing member (R), the radius of curvature of the corner portion may be in a range of 1.0 mm to 15.0 mm.

The length of the reinforcing member (R) in a direction perpendicular to the longitudinal direction and parallel with the first plate-like portion is denoted as a width W1. Further, the length of the reinforcing member (R) in a direction perpendicular to the longitudinal direction and parallel with the top plate portion is denoted as a width W2. As long as effects of the present invention will be achieved, the value of W1/W2, which is a ratio between the width W1 and the width W2, may be in a range of 0.5 to 2. Preferably, the value of W1/W2 is in a range of 0.7 to 1.4. The width W1 and the width W2 will be described in FIG. 8A.

The width W1 may be not less than 2.5 mm. Preferably, the width W1 is not less than 5 mm, and more preferably the width W1 is not less than 7.5 mm. Although there is no particular limitation on the upper limit of the width W1, if the width W1 is too large, properties per unit mass will deteriorate. The width W1 may be not more than 30 mm.

The width W2 may be not less than 5 mm. Preferably, the width W2 is not less than 10 mm, and more preferably the width W2 is not less than 15 mm. Although there is no particular limitation on the upper limit of the width W2, if the width W2 is too large, properties per unit mass will deteriorate. The width W2 may be not more than 30 mm.

The reinforcing member (R) may be fixed only to the press-formed product (P). That is, the reinforcing member (R) may not be fixed to any member other than the press-formed product (P). The same applies to a situation in which the structural member (S) is being used in an automobile. That is, in an automobile including the structural member (S) of the present embodiment, the reinforcing member (R) may be fixed only to the press-formed product (P).

In the structural member (S) of the present embodiment, a cross section of a boundary between the vertical wall portion and the top plate portion may have a rounded shape. In that case, the second plate-like portion may be disposed on the top plate portion side with respect to the starting position of the rounded shape in the vertical wall portion. According to this configuration, it is possible to inhibit the vertical wall portion from falling outwardly due to a collision from the top plate portion side. It is considered that inhibiting the vertical wall portion from falling outwardly enables improvement in properties against a collision from the top plate portion side.

Here, assume a first plane including the top plate portion. Further, assume a second plane which passes a starting position of the rounded shape in the vertical wall portion, and is parallel with the first plane. The second plate-like portion may be disposed in a region constituted by the first plane, the space between the first plane and the second plane, and the second plane. For example, the second plate-like portion may be in the same plane as the first plane. According to this configuration, it is possible to inhibit the vertical wall portion from falling outwardly due to a collision from the top plate portion side.

The distance D between the first plane including the top plate portion and the second plate-like portion may be in a range of 0 mm to 20 mm. The distance D will be described in FIG. 4.

In the structural member (S) of the present embodiment, when the structural member is projected from sideward, the projection region of the reinforcing member (R) may lie in a range of a projection region of the press-formed product (P). Note that the phrase "in a range of a projection region of the press-formed product (P)" includes an outer edge portion of the projection region of the press-formed product (P) as well. The meaning of the projection from sideward will be described in FIG. 5.

The reinforcing member (R) may be made from a metal sheet which is usable as a reinforcing member, or made of another material which is usable as a material for a reinforcing member. The metal sheet may be a steel sheet, or a sheet made of another metal material such as aluminum. That is, the reinforcing member (R) may be made of steel sheet. For a steel sheet for constituting the reinforcing member (R), the steel sheet which has been shown as an example for the steel sheet for constituting the press-formed product (p) can be used. One example of the reinforcing member (R) is formed by press-forming a steel sheet.

The structural member (S) of the present embodiment may include two reinforcing members (R). In this case, the reinforcing member (R) is fixed to each of the two vertical wall portions. According to this configuration, properties in a three-point bending test can be further improved. One example of the structural member (S) of the present embodiment includes only one reinforcing member (R), and the reinforcing member (R) is fixed to only one of the vertical wall portions. Moreover, the widths W2 of these two reinforcing members may differ from each other.

The press-formed product (P) may include two flange portions that extend respectively from the ends of the two vertical wall portions. The structural member (S) of the present embodiment may further include an additional member made of steel sheet. The additional member may be, hereinafter, referred to as "additional member (M)" or "member (M)". The additional member (M) may be fixed to the two flange portions of the press-formed product (P) such that the press-formed product (P) and the additional member (M) constitute a closed cross section. That is, the press-formed product (P) and the member (M) may constitute a hollow body. According to this configuration, properties in a three-point bending test can be further improved.

The member (M) may be of a metal plate. For example, the member (M) may be of a steel sheet. The member (M) may be formed of the same kind of the steel sheet that constitutes the press-formed product (P). The member (M) may be a plate-like member such as one called as a back plate, or a formed product that is press-formed. For example, the member (M) may have a same kind of shape as that of a press-formed product (P) having two flange portions. In that case, the two flange portions of the press-formed product (P) and the two flange portions of the member (M) can be fixed to each other.

In the structural member (S) of the present embodiment, to enhance effects of the reinforcing member (R), the reinforcing member (R) and the press-formed product (P) preferably satisfy Formula (1) shown below.

[Sheet-thickness (mm) of reinforcing member (R)]×
[Tensile strength (MPa) of reinforcing member
(R)]×0.8≥[Sheet-thickness (mm) of press-
formed product (P)]×[Tensile strength (MPa) of
press-formed product (P)]  (1)

Briefly, Formula (1) means that the strength of the reinforcing member (R) is preferably high to some extent. If the left hand side of Formula (1) is smaller than the right hand side, since the strength of the reinforcing member (R) is remarkably lower than that of the press-formed product (P), the vertical wall portions of the press-formed product are made less likely to fall inwardly upon a collision from the top plate portion side.

The structural member (S) of the present embodiment may be a bumper beam, a side sill, a center pillar, an A pillar, a roof rail, a door impact beam, a beltline reinforcement, or a roof arch. Alternatively, the structural member (S) may be used as another structural member for an automobile. The structural member (S) may be a component that undergoes bending deformation upon collision.

The structural member (S) of the present embodiment may include another reinforcing member in addition to the reinforcing member (R). For example, a reinforcing member having a cross section of an L-shape may be fixed to the press-formed product (P) so as to lie along the inside of the corner portion (corner portion at a boundary between the top plate portion and the vertical wall portion) of the press-formed product (P).

There is no particular limitation on the production method of the structural member (S) of the present embodiment, and it can be produced by a known method. For example, the press-formed product (P) and the reinforcing member (R) can be formed by a known press-forming. When the additional member (M) is a press-formed product as well, it can also be formed by a known press-forming. To fix those members, the above-described method can be applied. The structural member (S) of the present embodiment can be implemented simply by fixing the reinforcing member (R) from the outside to the existing press-formed product (P). Therefore, the structural member (S) is easy to produce.

Hereinafter, embodiments of the present invention will be described with reference to the drawings. The embodiments described below are exemplifications, and at least some of the configurations of the below-described embodiments can be replaced by the above-described configurations. In the following description, like parts may be given like symbols, thereby omitting overlapping description. Note that hereinafter, upward (top plate portion side) in FIG. 2 is referred to as upward of the structural member (S), and downward (the flange portion side) in FIG. 2 may be referred to as downward of the structural member (S).

ONE EXAMPLE OF STRUCTURAL MEMBER(S))

A perspective view of one example of the structural member (S) of the present embodiment is schematically shown in FIG. 1. A structural member 100 of FIG. 1 includes a press-formed product 110, and two reinforcing members 120 fixed to the press-formed product 110. The press-formed product 110 is one example of the above-described press-formed product (P). Each reinforcing member 120 is one example of the above-described reinforcing member (R).

Figure 2:
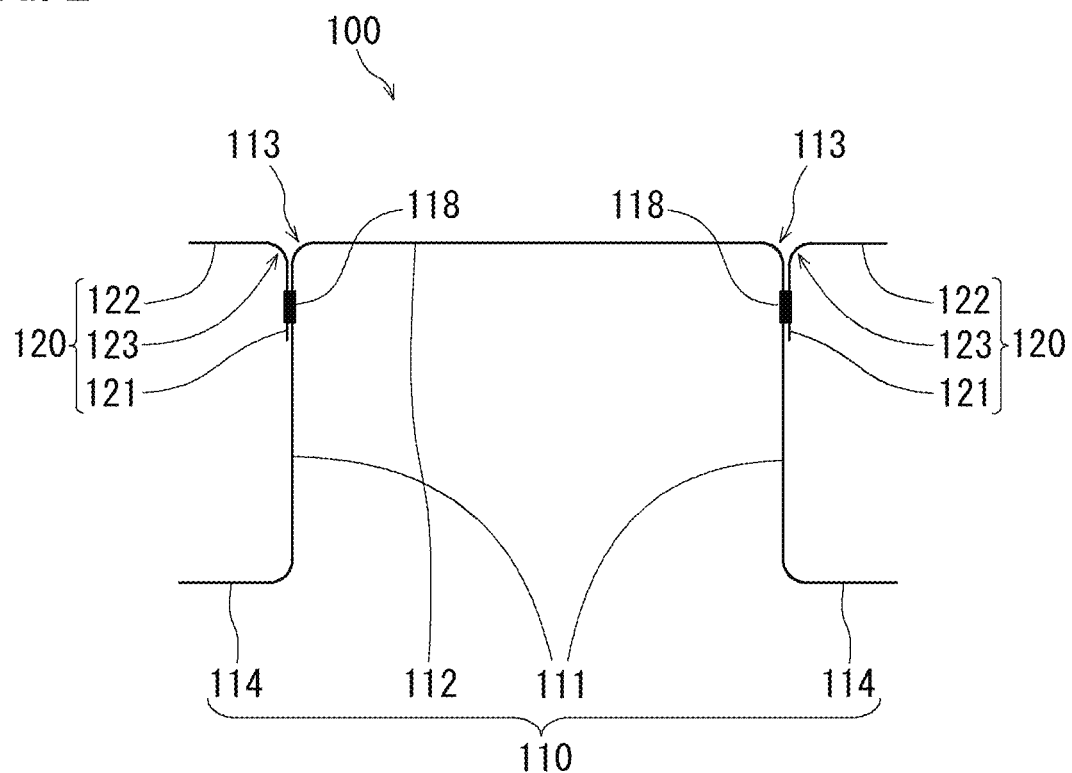
FIG. 2 is a cross sectional view of the structural member shown in FIG. 1.

A cross section of the structural member 100 (cross section perpendicular to the longitudinal direction of the structural member 100) is schematically shown in FIG. 2. The press-formed product 110 includes two vertical wall portions 111 and a top plate portion 112 linking the two vertical wall portions 111. Hereinafter, a ridge portion at a boundary between each vertical wall portion 111 and the top plate portion 112 may be referred to as a corner portion 113. The press-formed product 110 further includes two flange portions 114 which extend from ends of the two vertical wall portions 111. As shown in the following examples, the additional member (M) may be fixed to the flange portions 114. In an example shown in FIG. 2, the two flange portions 114 extend from lower end portions of the two vertical wall portions 111 substantially horizontally toward outward. That is, the flange portions 114 and the top plate portion 112 are substantially parallel with each other.

Each reinforcing member 120 includes a first plate-like portion 121 and a second plate-like portion 122. A cross section of the reinforcing member 120 (a cross section perpendicular to the longitudinal direction of the reinforcing member 120) has an L-shape. The first plate-like portion 121 is fixed to a vertical wall portion 111 by any of the above-described methods (welding and other methods). Here, the second plate-like portion 122 protrudes from the vertical wall portion 111 side toward an outward direction (horizontal direction) along the top plate portion 112. The first plate-like portion 121 is fixed to the vertical wall portion 111 such that the second plate-like portion 122 is disposed in this way. In the following drawings, a fixing portion 118 (and a fixing portion 119 to be described below) between the first plate-like portion 121 and the vertical wall portion 111 may be schematically shown.

The first plate-like portion 121 is fixed to the vertical wall portion 111 such that a corner portion (ridge portion) 123 at a boundary between the first plate-like portion 121 and the second plate-like portion 122 is disposed on the top plate portion 112 side. As a result, the second plate-like portion 122 and the top plate portion 112 are close to each other.

The reinforcing member 120 is not fixed to any member other than the press-formed product 110. That is, the reinforcing member 120 is fixed only to the press-formed product 110.

The fixing portion 118 between the first plate-like portion 121 and the vertical wall portion 111 is preferably provided at a position close to the top plate portion 112 (a position at which load is input). This is because, as the fixing portion 118 is closer to the top plate portion 112, a moment by which the first plate-like portion 121 presses the vertical wall portion 111 of the press-formed product 110 inward is more likely to occur.

Figure 3:
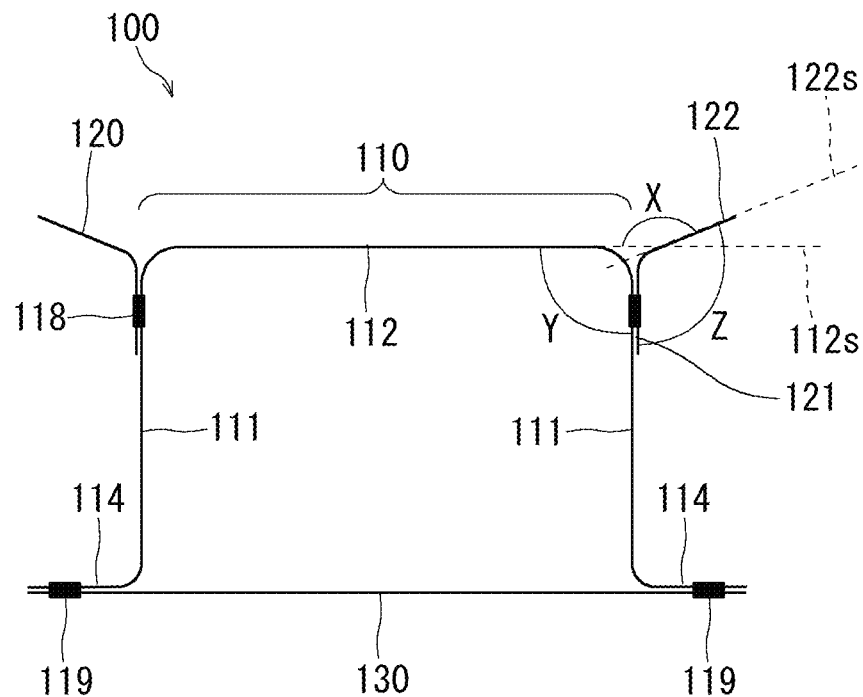
FIG. 3 is a cross-sectional view to schematically show another example of the structural member of the present embodiment.

A cross sectional view of another example of the structural member 100 is schematically shown in FIG. 3. FIG. 3 shows an example in which an additional member 130 is fixed to the flange portions 114. The additional member 130 is an example of the above-described the additional member (M). Further, FIG. 3 shows an example in which an angle X formed by the top plate portion 112 and the second plate-like portion 122 is not 180°. The flange portions 114 and the member 130 are fixed at the fixing portions 119.

As shown in FIG. 3, the angle X is an angle shown in FIG. 3 of the angles formed by a plane 112s including the top plate portion 112 and a plane 122s including the second plate-like portion 122. To be more specific, it is an angle located above the top plate portion 112 and the second plate-like portion 122 in FIG. 3 out of the angles formed by the plane 112s and the plane 122s. The angle X may be within the above-described range.

Note that when unevenness exists in the top plate portion 112, a major plane of the top plate portion (this plane is a plane which is substantially parallel with a virtual plane connecting the ends of the vertical wall portions) can be considered as a plane 112s including the top plate portion 112.

FIG. 3 shows an angle Y formed by the vertical wall portion 111 and the top plate portion 112. The angle Y is an angle on the inner side of the press-formed product 110 out of the angles formed by the vertical wall portion 111 and the top plate portion 112. The angle Y may be within the above-described range.

Further, FIG. 3 shows an angle Z formed by the first plate-like portion 121 and the second plate-like portion 122. The angle Z is a smaller angle out of the angles formed by the first plate-like portion 121 and the second plate-like portion 122. The angle Z may be within the above-described range.

Figure 4:
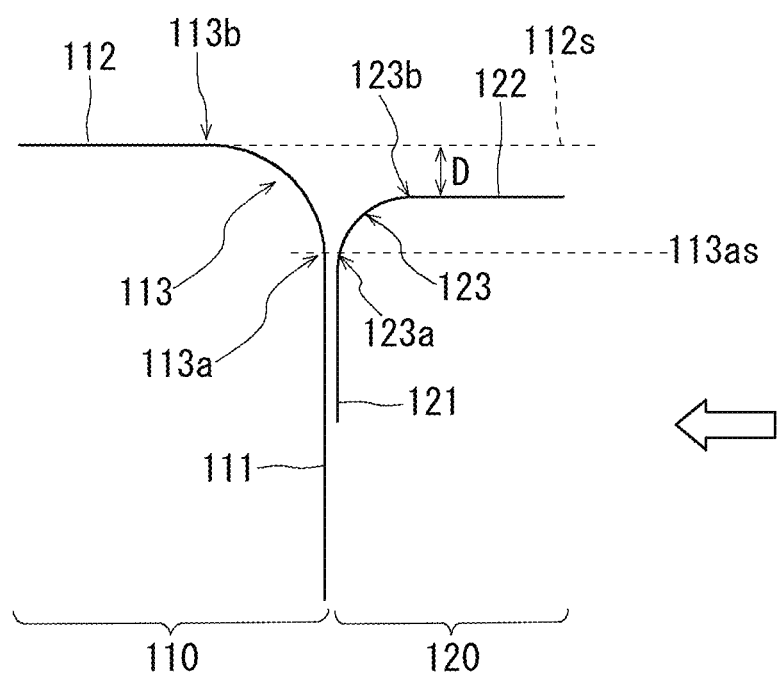
FIG. 4 is a cross-sectional view to schematically show another example of the structural member of the present embodiment.

An enlarged view of a part of one example of the structural member 100 is shown in FIG. 4. FIG. 4 is a cross-sectional view to show the vicinity of the corner portion 113.

In the example shown in FIG. 4, the second plate-like portion 122 is located below the top plate portion 112 (on the end side of the vertical wall portion 111). The cross section of the corner portion 113 at a boundary between the vertical wall portion 111 and the top plate portion 112 has a rounded shape which is rounded between two starting positions 113a and 113b. The starting position 113a of the rounded shape is the starting position on the vertical wall portion 111 side, and the starting position 113b is the starting position on the top plate portion 112 side. In the one example shown in FIG. 4, the second plate-like portion 122 is disposed on the top plate portion 112 side with respect to the starting position 113a of the rounded shape in the vertical wall portion 111.

The cross section of the corner portion 123 at a boundary between the first plate-like portion 121 and the second plate-like portion 122 has a rounded shape which is rounded between two starting positions 123a and 123b. The starting positions 123a of the rounded shape is the starting position (end point of R) on the first plate-like portion 121 side, and the starting position 123b is the starting position (end point of R) on the second plate-like portion 122 side.

Here, a plane including the top plate portion 112 is denoted as a first virtual plane 112s. Further, a plane passing through the starting position 113a and being parallel with the top plate portion 112 is denoted as a second virtual plane 113as. As shown in FIG. 4, the second plate-like portion 122 is preferably disposed at the same level as the first virtual plane 112s, or on the virtual plane 113as side with respect thereto. In addition, the second plate-like portion 122 is preferably disposed on the top plate portion 112 side with respect to the second virtual plane 113as. When the press-formed product 110 is a structural member for an automobile, the radius of curvature of the corner portion 113 of the press-formed product 110 is often not more than 20 mm. Therefore, the distance D between the first virtual plane 112s and the second plate-like portion 122 is preferably not more than 20 mm.

Further, the starting position 123a of the rounded shape of the corner portion 123 of the reinforcing member 120 is preferably disposed on the second virtual plane 113as. According to this configuration, the following effects will be achieved. When load is applied from the top plate portion 112 side, the corner portion 113 of the press-formed product 110 tends to deform toward an outward direction. However, there exists the corner portion 123 of the reinforcing member 120 outside the corner portion 113 of the press-formed product 110. For that reason, deformation toward an outward direction of the corner portion 113 of the press-formed product 110 is suppressed by the corner portion 123 of the reinforcing member 120. As a result of this, the vertical wall portion 111 of the press-formed product 110 becomes less likely to deform in an outward direction, and the vertical wall portion 111 becomes more likely to fall inwardly.

To achieve this effect, the second plate-like portion 122 of the reinforcing member 120 is preferably located closer to the first virtual plane 112s. In other words, the distance D between the first virtual plane 112s and the second plate-like portion 122 is preferably closer to 0. If the distance D is 0, the entire area of the corner portion 113 of the press-formed product 110 is opposed to the corner portion 123 of the reinforcing member 120. For that reason, when load is applied from the top plate portion 112 side, it is easy to suppress deformation of the corner portion 113 of the press-formed product 110 in an outward direction.

The distance D is preferably 0 to 10 mm, more preferably 0 to 5 mm, further preferably 0 to 3 mm, and most preferably 0 to 1 mm. The shorter the distance D, the more quickly the reinforcing member 120 can come into contact with a collision object (an impactor) upon collision. Since this allows early generation of force to press the vertical wall portion 111 inwardly with the reinforcing member 120 before the vertical wall portion 111 falls outwardly, anti-collision properties will be improved.

The radius of curvature of the corner portion 123 of the reinforcing member 120 is preferably larger than 5% of the entire length of the reinforcing member 120 in a cross sectional view of the reinforcing member 120. If the radius of curvature of the corner portion 123 is not more than 5% of the entire length in a cross sectional view of the reinforcing member 120, the corner portion 123 will be acute. If the corner portion 123 comes into contact with the corner portion 113 of the press-formed product 110, stress concentration is likely to occur. In the viewpoint of mitigating this stress concentration, it is preferable that the radius of curvature of the corner portion 123 of the reinforcing member 120 is larger than 5% of the entire length in a cross-sectional view of the reinforcing member 120.

Further, the radius of curvature of the corner portion 123 of the reinforcing member 120 is preferably less than 50% of the entire length of the reinforcing member 120 in a cross-sectional view of the reinforcing member 120. If the radius of curvature of the corner portion 123 is not less than 50% of the entire length in a cross-sectional view of the reinforcing member 120, it is difficult to ensure sufficient lengths in a cross-sectional view of the first plate-like portion 121 and the second plate-like portion 122 of the reinforcing member 120. For that reason, a preferable upper limit of the radius of curvature of the corner portion 123 of the reinforcing member 120 is 50% of the entire length in a cross-sectional view of the reinforcing member 120.

More specifically spXeaking about a preferable range of the radius of curvature of the corner portion 123 of the reinforcing member 120, when the press-formed product 110 is a structural member for an automobile, the radius of curvature of the corner portion 123 of the reinforcing member 120 is preferably more than 3 mm. Moreover, the radius of curvature of the corner portion 123 of the reinforcing member 120 is preferably less than 10 mm.

Note that a case in which the corner portion 123 of the reinforcing member 120 has a cross section of a round shape is described in FIG. 4. However, the cross section of the corner portion 123 of the reinforcing member 120 may have a shape in which the starting positions 123a and 123b of the round shape are connected by a straight line. In this case, the length of the straight portion in a cross-sectional view of the corner portion 123 is preferably larger than 5% of the entire length in a cross-sectional view of the reinforcing member 120, and is preferttably less than 50% of the entire length in a cross-sectional view of the reinforcing member 120. When the press-formed product 110 is a structural member for an automobile, the length of the straight portion of the corner portion 123 in a cross-sectional view of the reinforcing member 120 is preferably more than 3 mm, and preferably less than 10 mm.

Moreover, when the angle X is not 180°, the distance D between the first virtual plane 112s and the second plate-like portion 122 is supposed to be the distance in the virtual plane vertical direction between the starting position (end point of R) 123b of the rounded shape on the second plate-like portion 122 side of the corner portion 123 and the first virtual plane 112s.

Figure 5:
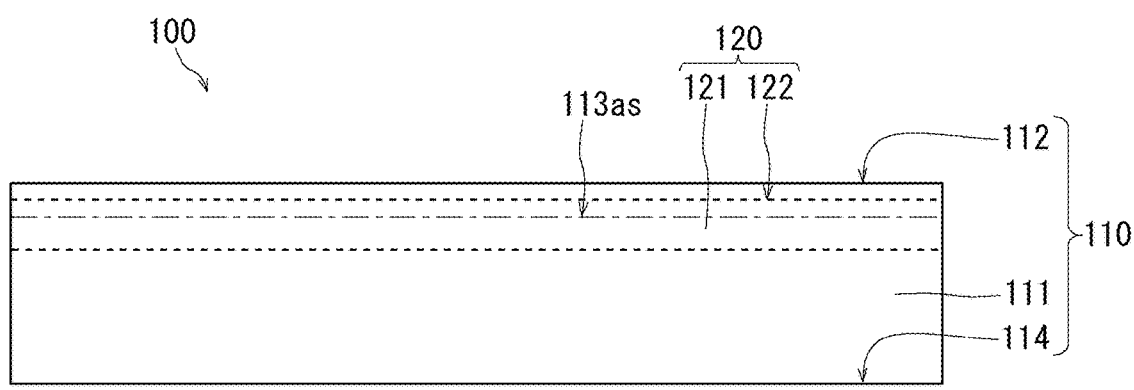
FIG. 5 is a projection view of the structural member shown in FIG. 4.

FIG. 5 schematically shows a projection view of the structural member 100 shown in FIG. 4 when projected from sideward. Here, a projection view from sideward means a projection view when projection is performed from a direction shown by an arrow in FIG. 4. This projection direction is perpendicular to the longitudinal direction of the structural member 100 and is parallel with the top plate portion 112.

In an example shown in FIG. 5, a projection region of the reinforcing member 120 lies in a range of a projection region of the press-formed product 110. The second plate-like portion 122 is disposed between the plane 112s and the plane 113as. Since the structural member 100 becomes compact according to such configuration, the structural member 100 is less likely to interfere with other components. The less likeliness of the structural member 100 interfering with other components means the less likeliness of the reinforcing member 120 interfering with other components. If the reinforcing member 120 is brought into contact with an additional member when load is applied to the structural member, the force with which the reinforcing member 120 causes the vertical wall portion 111 of the press-formed product 110 to fall inwardly decreases. Therefore, the projection region of the reinforcing member 120 preferably lies in a range of the projection region of the press-formed product 110.

Figure 6A:
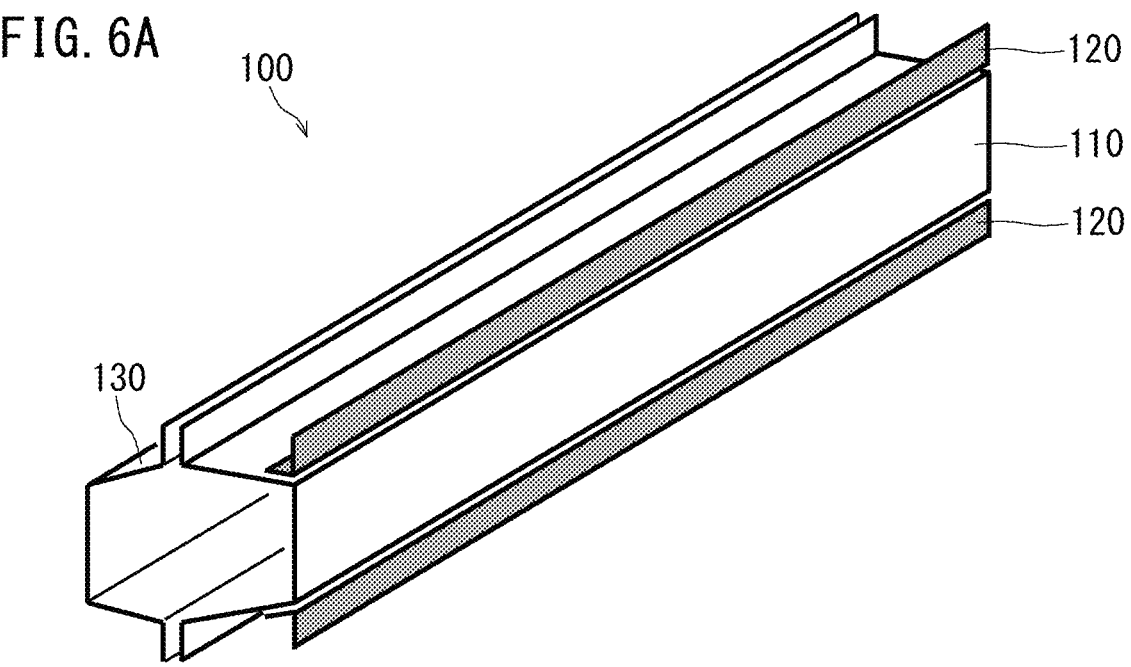
FIG. 6A is a perspective view to schematically show another example of the structural member of the present embodiment.
Figure 6B:
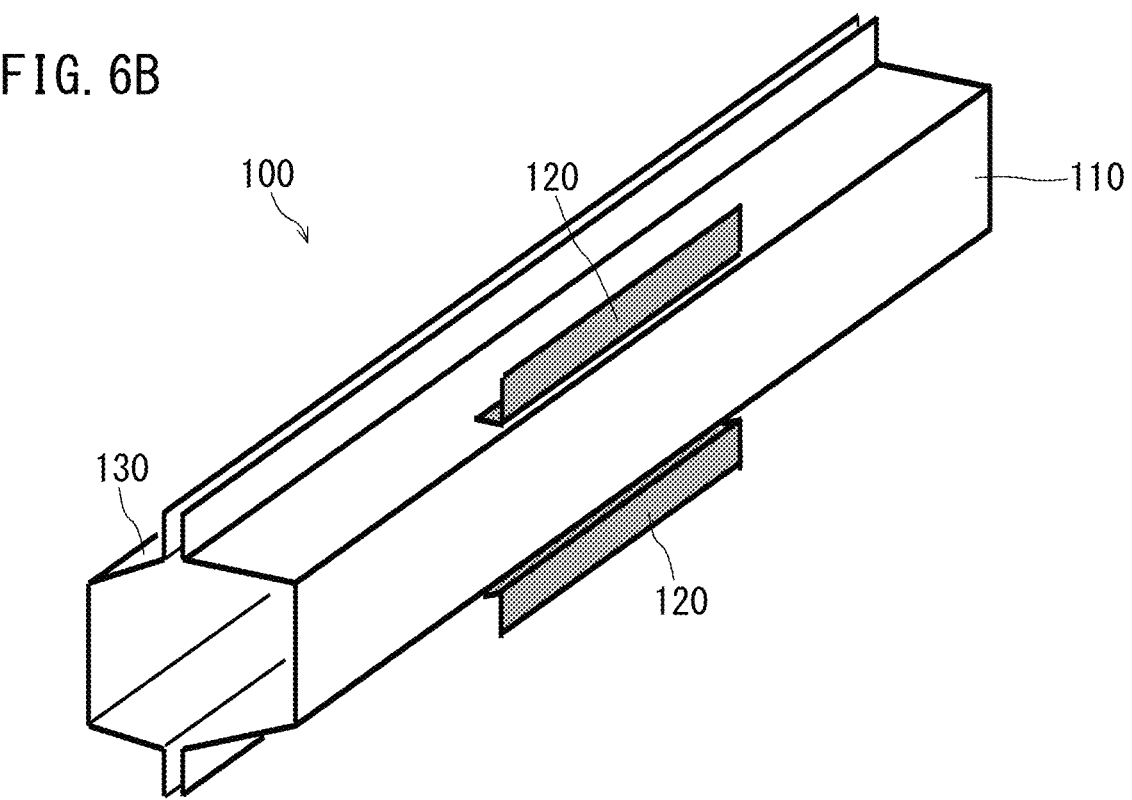
FIG. 6B is a perspective view to schematically show another example of the structural member of the present embodiment.

An example in which the structural member of the present embodiment is a side sill is schematically shown by perspective views of FIGS. 6A and 6B. To facilitate understanding, the reinforcing member 120 is indicated by a gray color in FIGS. 6A and 6B, and FIG. 7A to be described below. The structural members (side sills) 100 shown in FIGS. 6A and 6B each include a press-formed product 110, two reinforcing members 120, and an additional member 130. In an example shown in FIG. 6A, each reinforcing member 120 is disposed over the entire press-formed product 110 in the longitudinal direction. As shown in FIG. 6B, each reinforcing member 120 may be disposed over only a part of the press-formed product 110 in the longitudinal direction.

Besides, when the structural member of the present embodiment is a bumper beam as well, the reinforcing member 120 may be disposed over only a part of the longitudinal direction of the press-formed product 110. The bumper beam has its two ends in the longitudinal direction attached to a crash box, etc. For that reason, the middle of the longitudinal direction of the bumper beam is most likely to be deflected. As with the side sill shown in FIG. 6B, providing the reinforcing member 120 only in the middle of the structural member 100 can reinforce the middle of the bumper beam where strength is required most. Further, it is possible to reduce the weight of the two end portions in the longitudinal direction of the bumper beam, where reinforcement is not necessarily required, due to the absence of the reinforcing member 120. In short, by providing the reinforcing member 120 only at a location where strength is required, it is possible to achieve both improvement in strength and reduction of weight of the structural member 100.

When the reinforcing member 120 is provided at a part of the longitudinal direction of the press-formed product 110, when the entire length in the longitudinal direction of the press-formed product 110 is denoted as L, it is preferable that the reinforcing member 120 is provided in a region up to a distance of L/6 to both sides from the middle of the longitudinal direction of the press-formed product 110 (a region of L/3 as a whole).

Figure 7A:
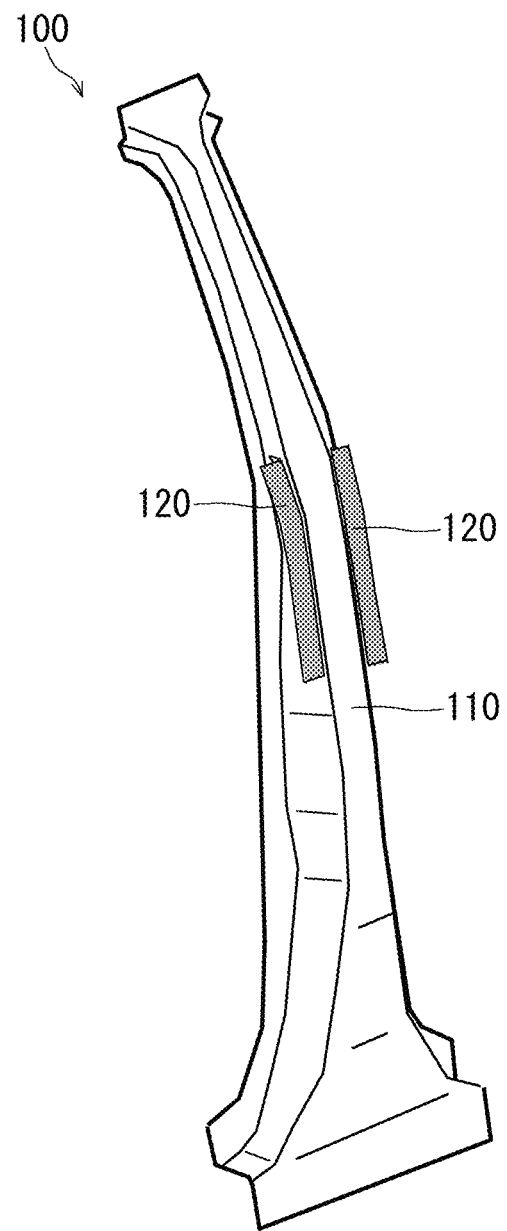
FIG. 7A is a perspective view to schematically show another example of the structural member of the present embodiment.

An example in which the structural member of the present embodiment is a center pillar is schematically shown by a perspective view of FIG. 7A. The structural member (center pillar) 100 shown in FIG. 7A includes a press-formed product 110 and two reinforcing members 120. In an example shown in FIG. 7A, the reinforcing members 120 are disposed over only a part of the press-formed product 110 in the longitudinal direction.

Examples of the cross-sectional shape of the reinforcing member 120 of the present embodiment are shown in FIGS.

7B to 7D. As shown in FIG. 7B, the cross-sectional shape of the reinforcing member 120 may be a U-shape linking three straight sides. As shown in FIG. 7C, the cross-sectional shape of the reinforcing member 120 may be a triangular shape. As shown in FIG. 7D, the cross-sectional shape of the reinforcing member 120 may be a rectangular shape. That is, the reinforcing member 120 may include any plate-like portion other than the first plate-like portion 121 and the second plate-like portion 122, or may not include the any plate-like portion. In any of FIGS. 7B to 7D, as described above, when load is applied to the top plate portion 112 of the press-formed product 110, the reinforcing member 120 can make the vertical wall portion 111 of the press-formed product 110 fall inwardly, thus achieving effects by the structural member of the present embodiment.

EXAMPLES

The present invention will be described in more detail by way of examples.

Example 1

Figure 8A:
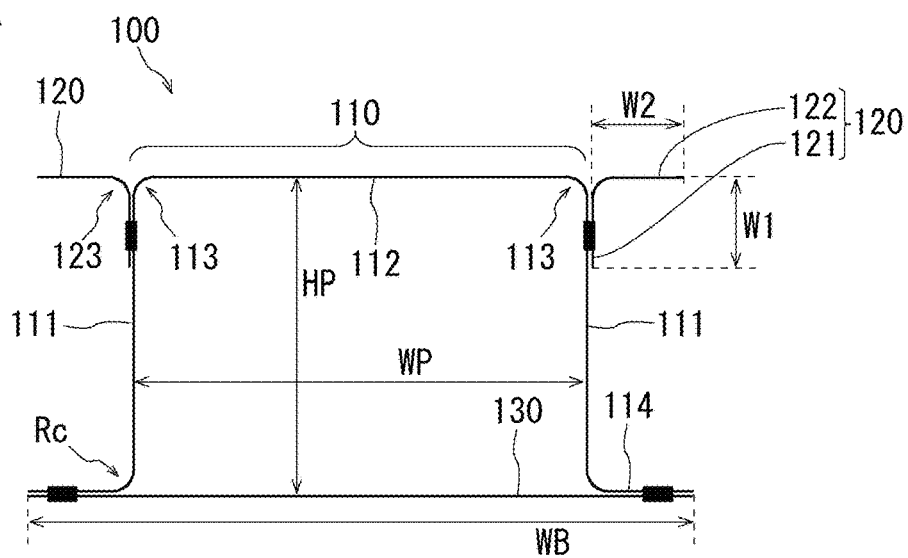
FIG. 8A is a cross-sectional view to schematically show a structure of Sample 3 of Inventive Example used in Examples.

In Example 1, simulation of a three-point bending test was conducted on a structural member of the present embodiment (Inventive Example) and a structural member of Comparative Example. A general-purpose FEM (finite element method) software (supplied by Livermore Software Technology Corporation, Product Name: LS-DYNA) was used for the simulation. A cross-sectional view of Sample 3 (Inventive Example) used in the simulation is schematically shown in FIG. 8A. The structural member 100 of FIG. 8A is consisted of the press-formed product 110, the two reinforcing members 120, and an additional member (back plate) 130 welded to a flange portion 114 of the structural member 100. The sizes of sample 3 shown in FIG. 8A were as follows. Where, the thickness of steel sheet was not taken into consideration in the following sizes. In Sample 3, the top plate portion 112 and the second plate-like portion 122 were on the same plane. In Sample 3, it was assumed that the first plate-like portion 121 be fixed to the vertical wall portion 111 by spot welding (pitch: 40 mm).

Angle X (angle between the top plate portion and the second plate-like portion): 180°

Angle Y (angle between the top plate portion and the vertical wall portion): 90°

Angle Z (angle between the first plate-like portion and the second plate-like portion): 90°

Tensile strength of steel sheet constituting the structural member: 1180 MPa

Thickness of steel sheet constituting the structural member: 1.4 mm

Height of L-shape portion (width W1): 20 mm

Width of L-shape portion (width W2): 20 mm

Height HP of vertical wall portion: 60 mm

Distance between two vertical wall portions (width WP of top plate portion): 80 mm Width WB of back plate: 120 mm Radius of curvature at the corner portions 113 and 123, and Rc: 5 mm Length in the longitudinal direction: 1000 mm The width W1 is a length of the reinforcing member 120 in a direction perpendicular to the longitudinal direction of the structural member 100 and parallel with the first plate-like portion 121. The width W2 is a length of the reinforcing member 120 in a direction perpendicular to the longitudinal direction of the structural member 100 and parallel with the top plate portion 112. The width W2 corresponds to a length at which the reinforcing member 120 protrudes from the vertical wall portion 111 in a horizontal direction.

Figure 8B:
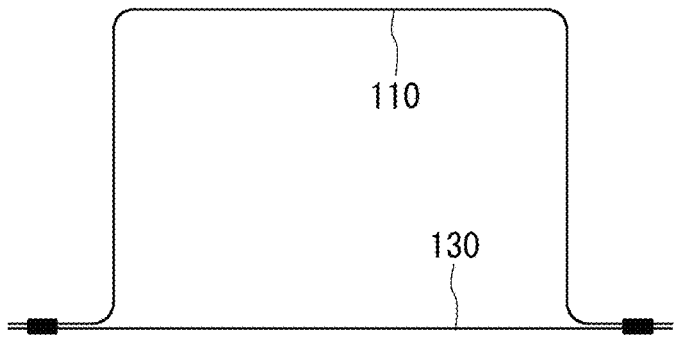
FIG. 8B is a cross-sectional view to schematically show a structure of Sample 1 of Comparative Example used in Examples.
Figure 8C:
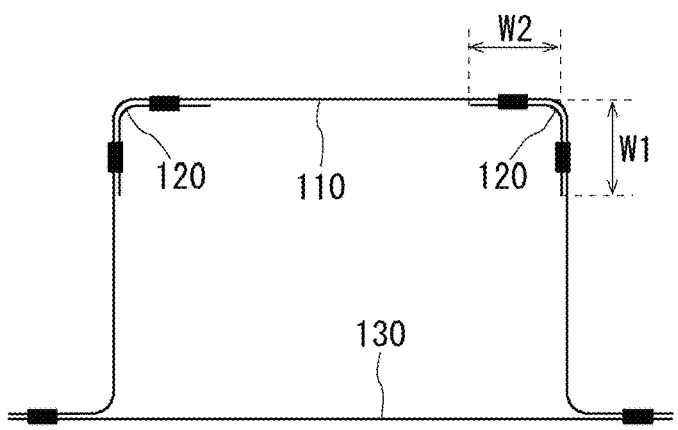
FIG. 8C is a cross-sectional view to schematically show a structure of Sample 2 of Comparative Example used in Examples.
Figure 8D:
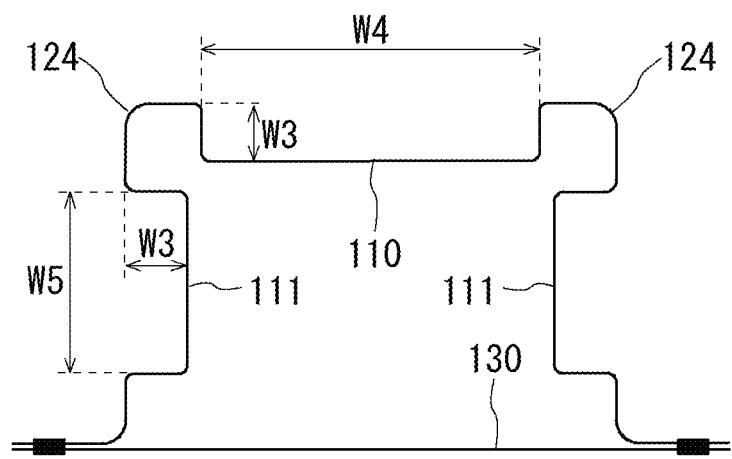
FIG. 8D is a cross-sectional view to schematically show a structure of Sample 4 of Comparative Example used in Examples.

A cross-sectional view of Sample 1 (Comparative Example) used in the simulation is schematically shown in FIG. 8B, and a cross-sectional view of Sample 2 (Comparative Example) is shown FIG. 8C, and a cross-sectional view of Sample 4 (Comparative Example) is shown in FIG. 8D. Sample 1 is a sample having a structure in which the reinforcing members 120 are removed from the structural member 100 of Sample 3. Sample 2 is a sample in which L-shaped reinforcing members 120 are spot-welded to the inside of the corner portion 113 of the press-formed product 110. Sample 4 is a sample in which the reinforcing members 120 are removed from the structural member 100 of Sample 3; a part of each of the top plate portion 112 and the two vertical wall portions 111 is indented inwardly; and a bulging portion 124 is provided in a connection region between the top plate portion 112 and each vertical wall portion 111. There is no steel sheet placed on the bulging portion 124 of Sample 4.

In Sample 2, to make the reinforcing member 120 lie along the press-formed product 110, the radius of curvature at the corner portion 123 of the reinforcing member 120 was made 3.6 mm. Also widths W1 and W2 of the reinforcing member 120 of Sample 2 were 18.6 mm, respectively. The press-formed products 110 and the members 130 of Samples 2 and 3 were the same as those of Sample 1.

In Sample 4, an inward indentation amount W3 of each of the top plate portion 112 and the two vertical wall portions 111 was 14 mm. An indentation width W4 of the top plate portion 112 was 50 mm, and was provided such that the shape of the top plate portion was bilaterally symmetrical. An indentation width W5 of one vertical wall portion 111 was 30 mm, and was provided such that the shape of one vertical wall portion was vertically symmetrical. The same was applied to the other vertical wall portion.

Figure 9:
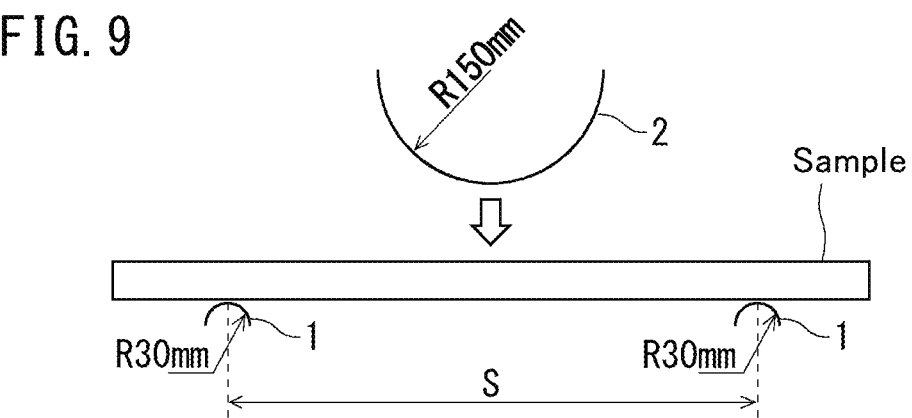
FIG. 9 is a diagram to schematically show conditions of a three-point bending test in Examples.

The method of the three-point bending test used in the simulation is schematically shown in FIG. 9. The three-point bending test was performed in such a way that a sample was placed on two fulcrums 1 and the sample was pressed from above by an impactor 2. In the test of Example 1, the distance S between the two fulcrums 1 was 400 mm or 700 mm. The radius of curvature of the fulcrums 1 was 30 mm. The radius of curvature of the impactor 2 was 150 mm. The collision speed of the impactor 2 was 7.5 km/h. The width of the impactor 2 (length in a direction perpendicular to the page surface of FIG. 9) was larger than a total (120 mm) of widths of the top plate portion 112 and the reinforcing member 120 of Sample 3.

Figure 10:
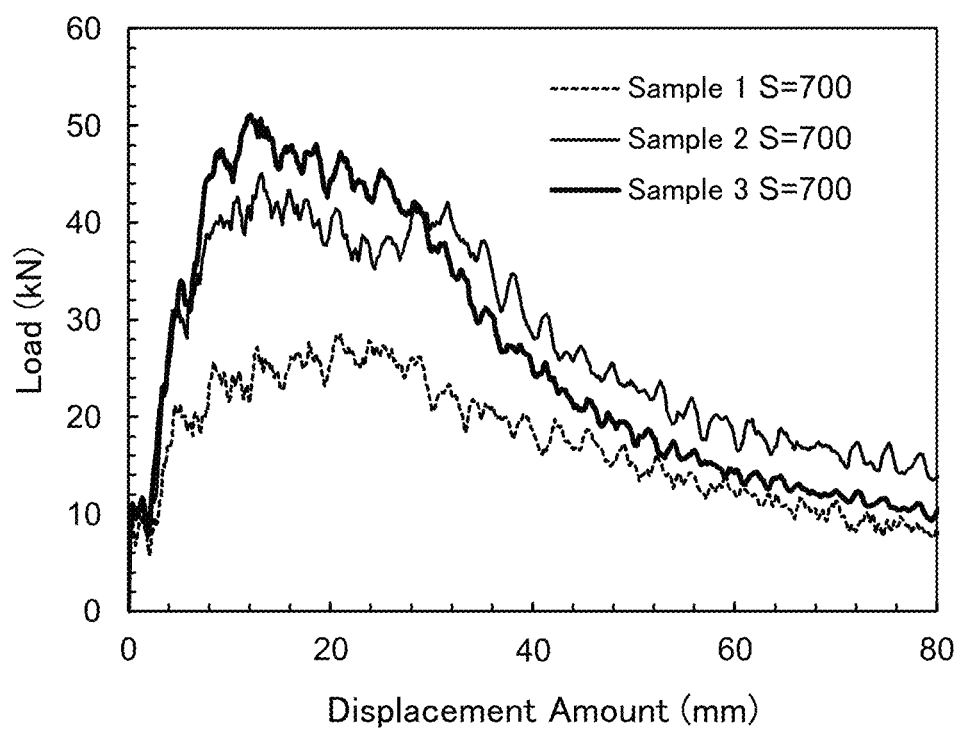
FIG. 10 is a graph to illustrate an example of results of Example 1.

In the simulation of the three-point bending test, it was assumed that the impactor 2 was made to collide from the top plate portion 112 side of each sample. Simulation results in a case in which the inter-fulcrum distance S was 700 mm are shown in FIGS. 10 to 13. Note that a result of simulation of Sample 4 is shown only in FIG. 12. The abscissa of FIG. 10 shows displacement amount. Here, the displacement amount is a moved distance of the impactor 2 from when the impactor 2 collided with the sample. The ordinate of FIG. 10 shows load that occurred in the impactor 2.

Figure 11:
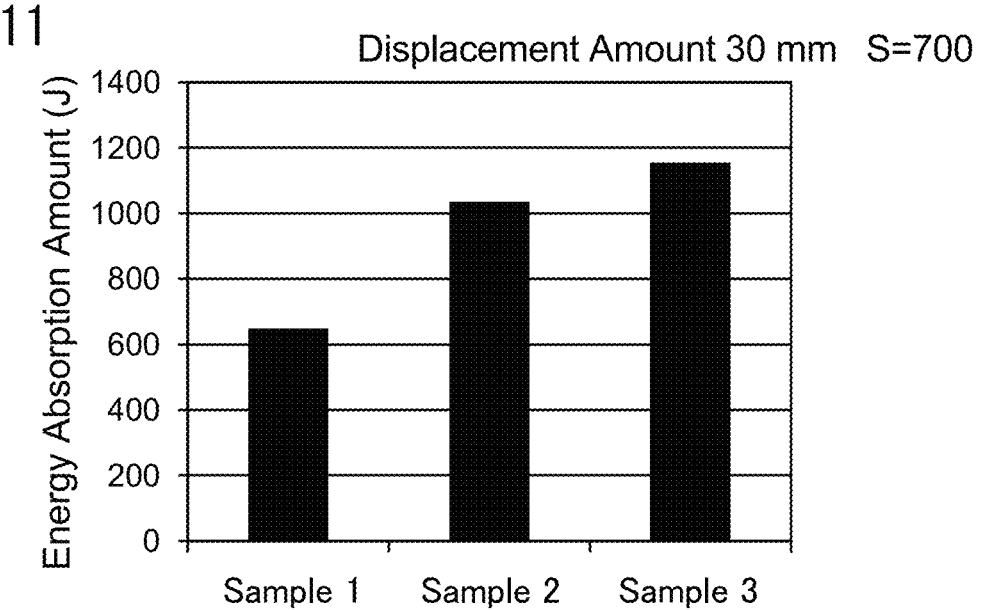
FIG. 11 is a graph to illustrate another example of results of Example 1.
Figure 12:
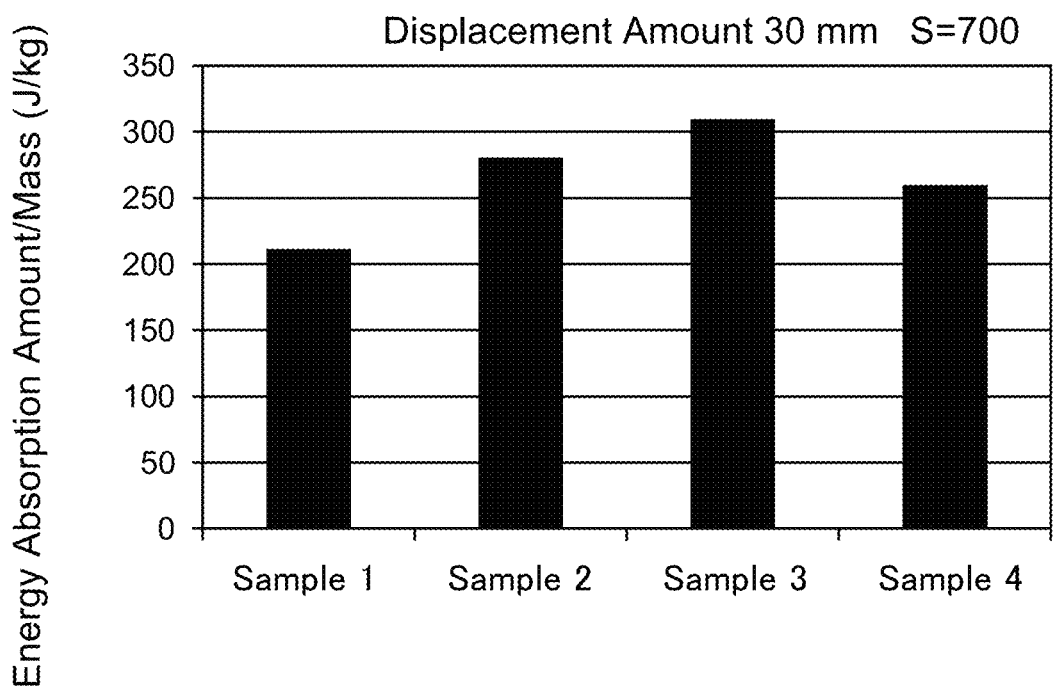
FIG. 12 is a graph to illustrate another example of results of Example 1.
Figure 13:
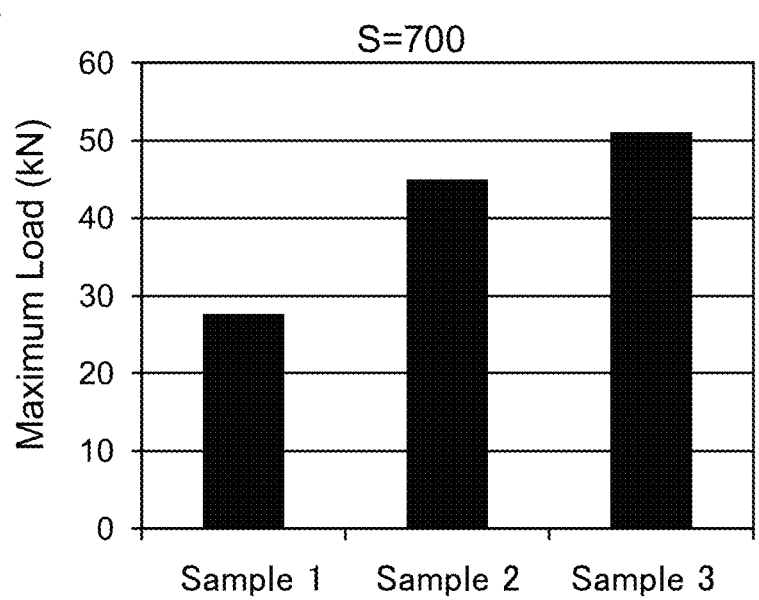
FIG. 13 is a graph to illustrate another example of results of Example 1.

FIG. 11 shows energy absorption amount of each sample at a time point when the displacement amount was 30 mm. Further, FIG. 12 shows results of evaluation of energy absorption amount of each sample at a time point when the displacement amount was 30 mm in consideration of the mass of each sample. The ordinate of FIG. 12 shows values of the energy absorption amount of the ordinate of FIG. 11 divided by the mass of each sample. Further, FIG. 13 shows maximum values of load applied up to a time point when the displacement amount was 20 mm.

As shown in FIGS. 10 and 11, Sample 3 of Inventive Example exhibited larger load and larger energy absorption amount in a region of an early stage of collision (region in which displacement amount was not more than about 30 mm) compared to Samples 1 and 2, which were Comparative Examples. Larger load and larger energy absorption amount mean higher resistance against collision. Further, the results of FIG. 12 show that even for the structural members with the same mass, the properties of Sample 3 of Inventive Example were higher than those of Samples 1, 2, and 4 which were Comparative Examples. For that reason, according to the present invention, it is possible to reduce the weight of the structural member while maintaining collision safety performance.

Figure 14A:
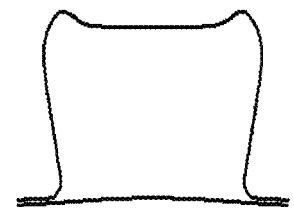
FIG. 14A is a cross-sectional view to show a state of deformation of Sample 1 in the three-point bending test of Example 1.
Figure 14B:
FIG. 14B is a cross-sectional view to show a state of deformation of Sample 2 in the three-point bending test of Example 1.
Figure 14C:
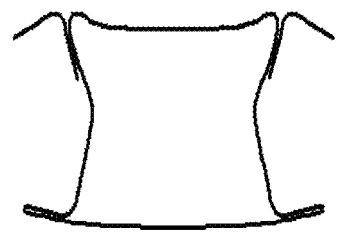
FIG. 14C is a cross-sectional view to show a state of deformation of Sample 3 in the three-point bending test of Example 1.
Figure 15:
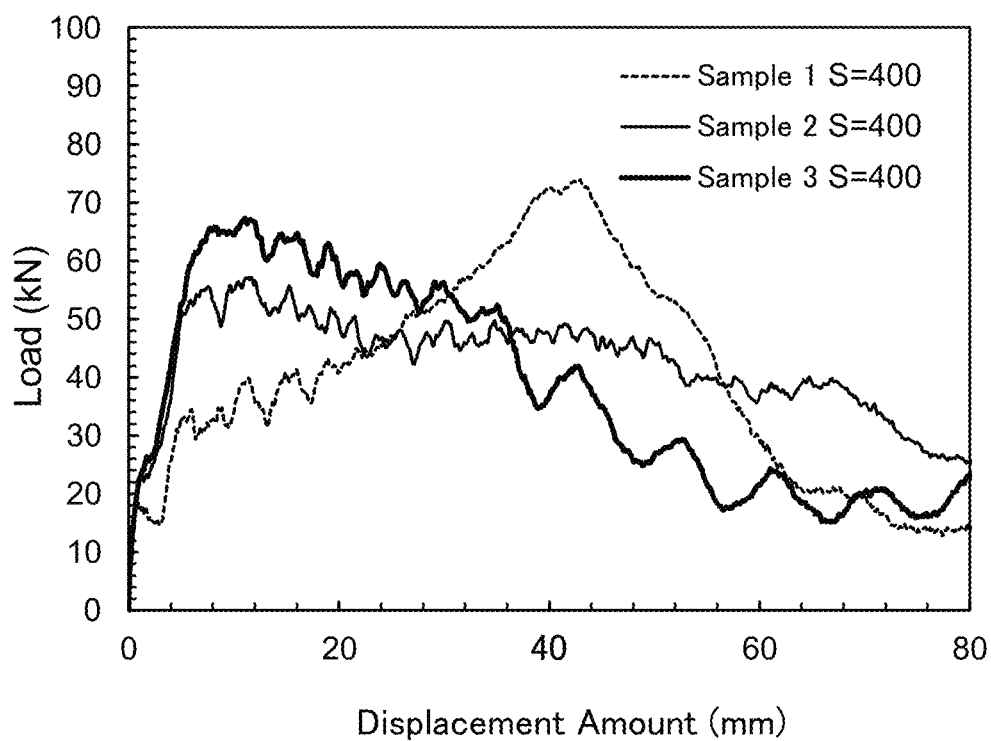
FIG. 15 is a graph to illustrate another example of results of Example 1.
Figure 16:
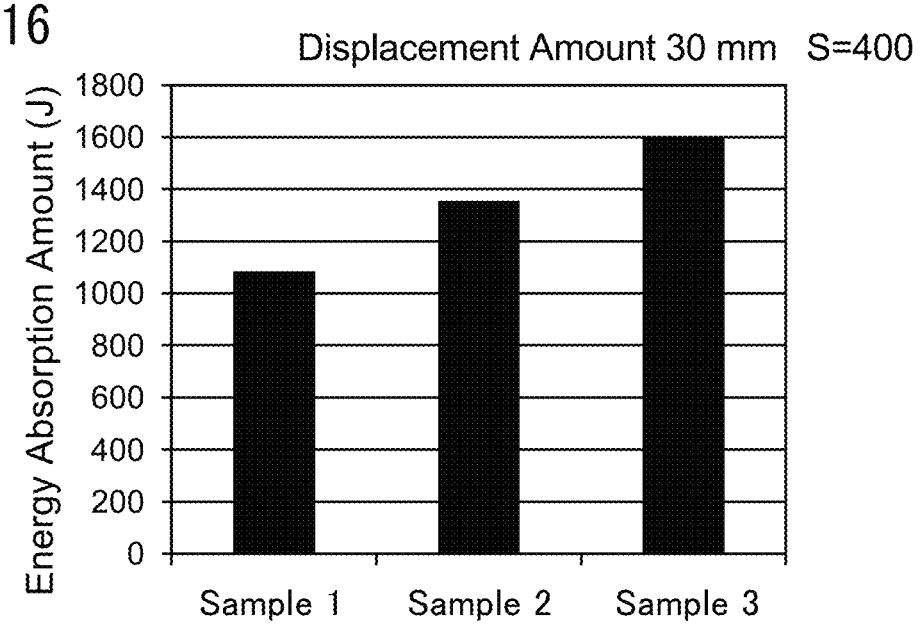
FIG. 16 is a graph to illustrate another example of results of Example 1.
Figure 17:
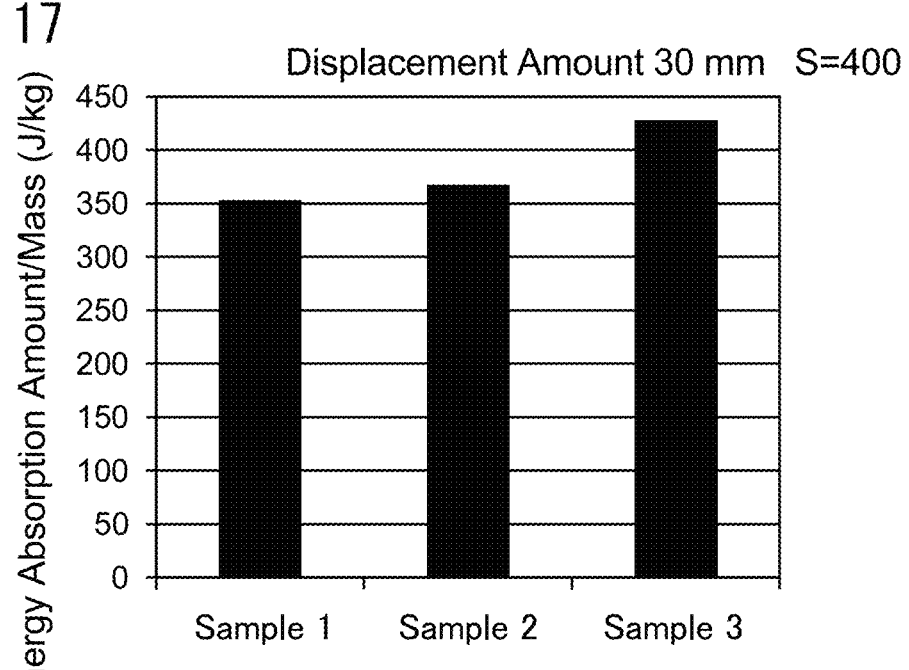
FIG. 17 is a graph to illustrate another example of results of Example 1.

FIGS. 14A to 14C show simulation results of cross-sectional shape of each sample when the displacement amount was 20 mm in a case in which the inter-fulcrum distance S was 700 mm. In Sample 1 shown in FIG. 14A and Sample 2 shown in FIG. 14B, the vertical wall portion falls outwardly. On the other hand, in Sample 3 shown in FIG. 14C, the vertical wall portion falls inwardly. Although the reason why the properties of Sample 3 were excellent is not clear at present, there is a possibility that the vertical wall portion supported the load as a result of falling inwardly.

The above-described results are qualitatively considered to be caused by the fact that while decrease in the cross-sectional secondary moment during deformation is large in Samples 1 and 2, decrease in the cross-sectional secondary moment is small in Sample 3. In anyway, anti-collision properties are more excellent when the vertical wall portion falls inwardly than when falls outwardly. Here was shown an example in which the cross-sectional shape of the reinforcing member was formed into an L-shape and joined to the ridge portion (boundary between the vertical wall portion and the top plate portion) in order to make the vertical wall portion fall inwardly. As a result of joining the reinforcing member having an L-shaped cross section in this way, the reinforcing member is deformed to be rotated in such a way to press the vertical wall portion inwardly when load is applied. That is, although a reinforcing member having an L-shaped cross section was joined to the ridge portion in this example, the shape of the reinforcing member may be any one provided that it can deform in such a way to make the vertical wall portion fall inwardly.

Figure 18:
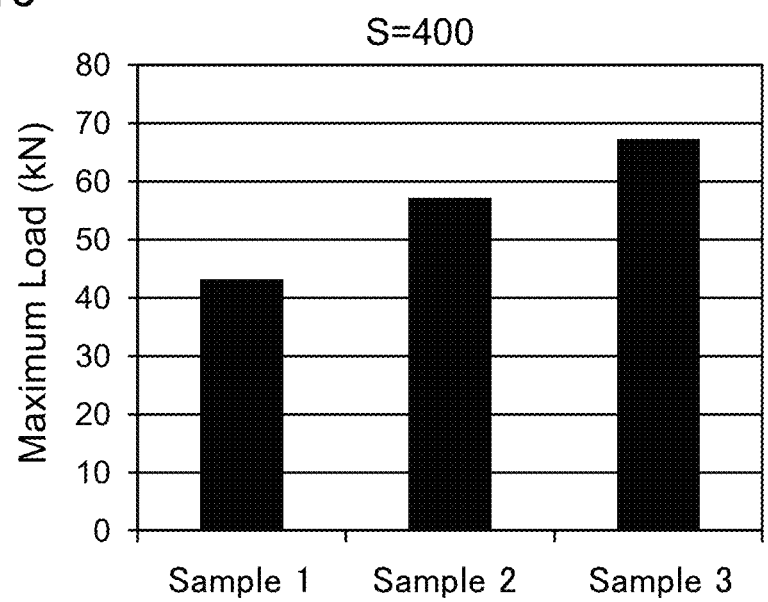
FIG. 18 is a graph to illustrate another example of results of Example 1.

FIGS. 15 to 18 show simulation results when the inter-fulcrum distance S was 400 mm. FIGS. 15 to 18 are figures corresponding to FIGS. 10 to 13, respectively. As with FIG. 13, FIG. 18 shows maximum values of load applied up to a time point when the displacement amount was 20 mm. As with when the distance S was 700 mm, when the distance S was 400 mm as well, Sample 3 of Inventive Example exhibited higher properties than Samples 1 and 2, which ware Comparative Examples.

Example 2

In Example 2, simulation was performed by varying the width W2 of Sample 3. To be specific, the width W2 of Sample 3 was varied from 20 mm (Sample 3) to 15 mm (Sample 3a), 10 mm (Sample 3b), and 5 mm (Sample 3c). Samples 3 and 3a to 3c are Inventive Examples. For those samples and Samples 1 and 2 of Comparative Example, similar evaluation as in Example 1 was performed. Samples 1 and 2 of Comparative Example were the same as Samples 1 and 2 described in Example 1.

Figure 19:
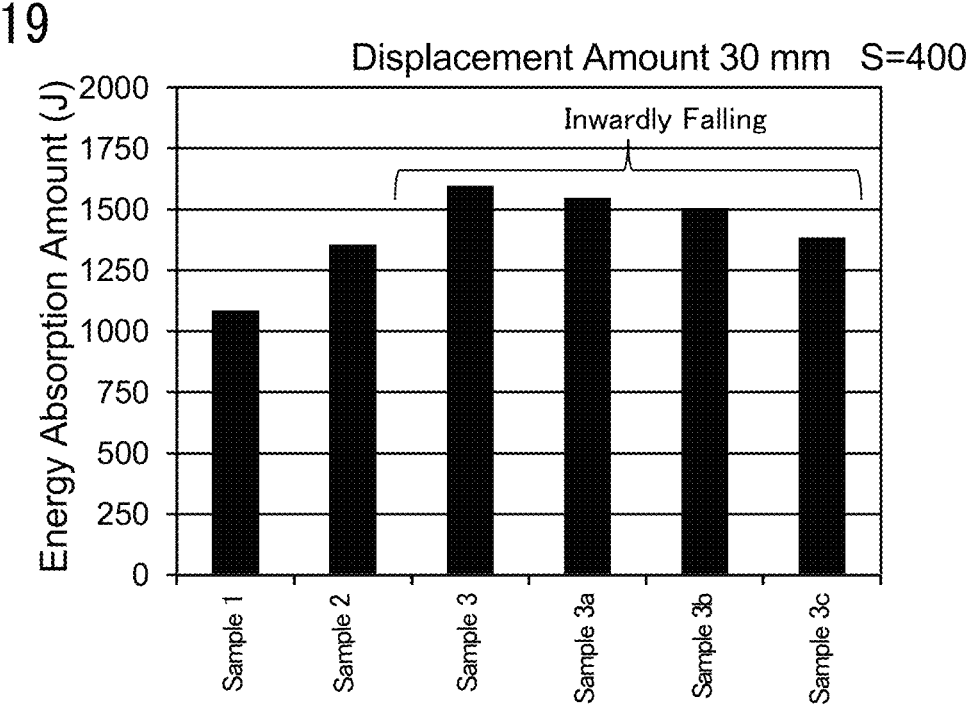
FIG. 19 is a graph to illustrate another example of results of Example 2.
Figure 20:
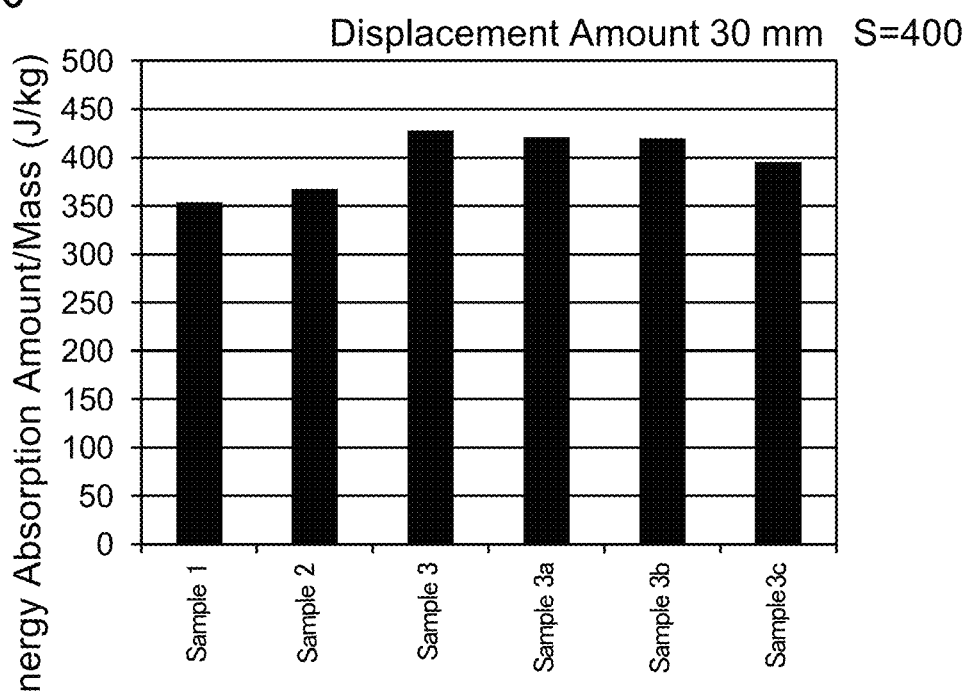
FIG. 20 is a graph to illustrate another example of results of Example 2.
Figure 21:
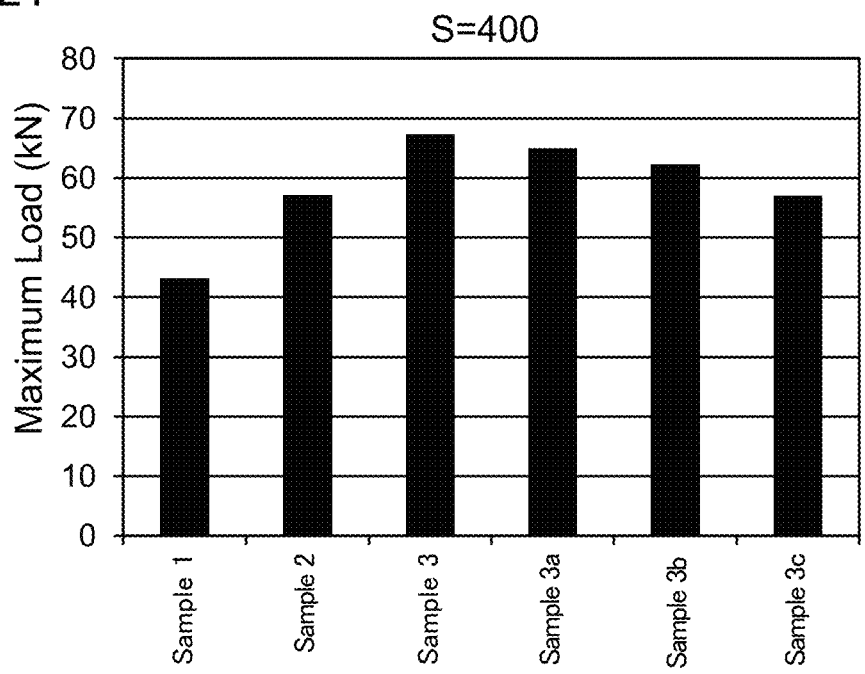
FIG. 21 is a graph to illustrate another example of results of Example 2.

FIGS. 19 to 21 show simulation results when the inter-fulcrum distance S was 400 mm. FIGS. 19 to 21 are figures corresponding to FIGS. 11 to 13, respectively. Note that, when the inter-fulcrum distance S was 400 mm, simulation results of Sample 4 are not shown.

As shown in FIGS. 19 and 20, the samples of Inventive Example exhibited higher properties in the three-point bending test compared to samples of Comparative Example. When the distance S was 400 mm, if the L-shape width was not less than 5 mm, properties not less than those of Comparative Example were able to be obtained. Note that in any of samples of Inventive Example, the vertical wall portion was caused to fall inwardly by a collision of the impactor.

Figure 22:
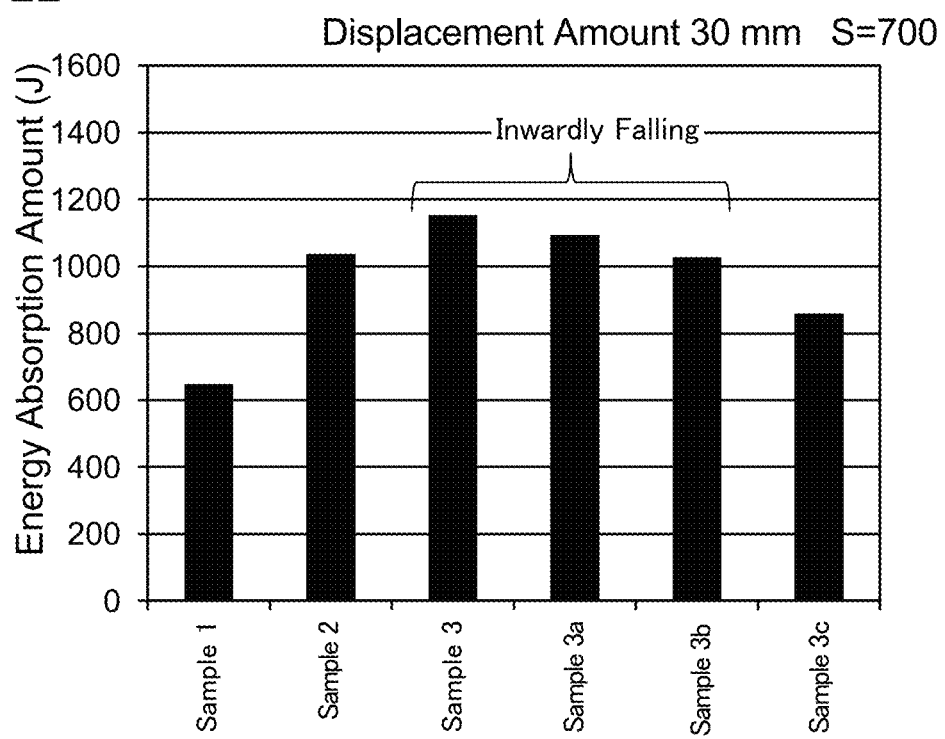
FIG. 22 is a graph to illustrate another example of results of Example 2.
Figure 23:
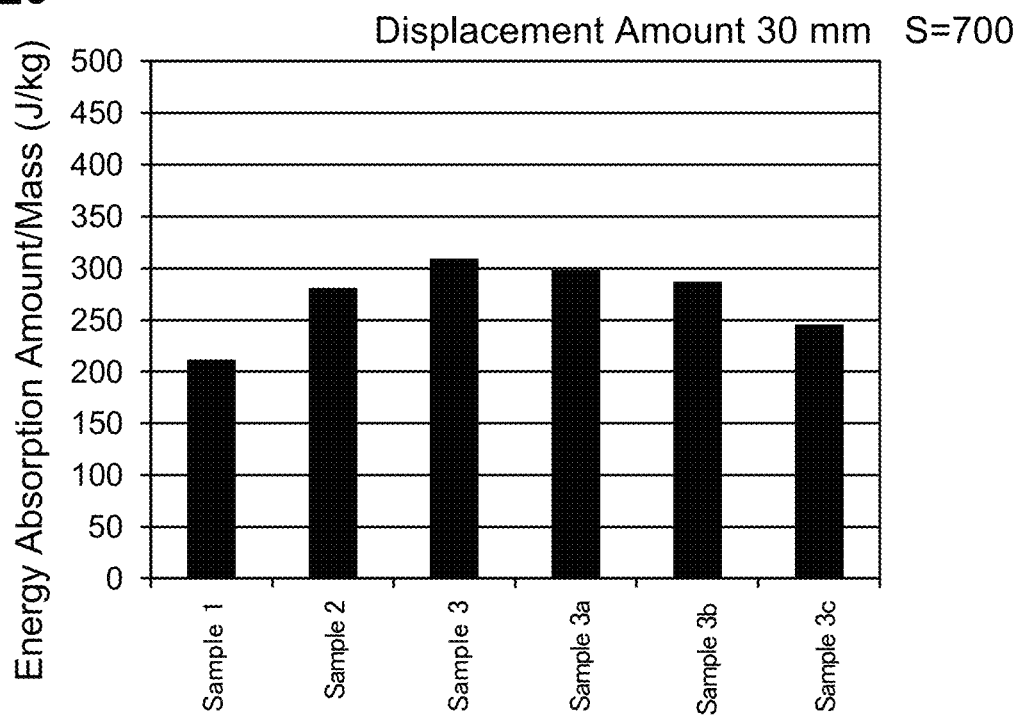
FIG. 23 is a graph to illustrate another example of results of Example 2.
Figure 24:
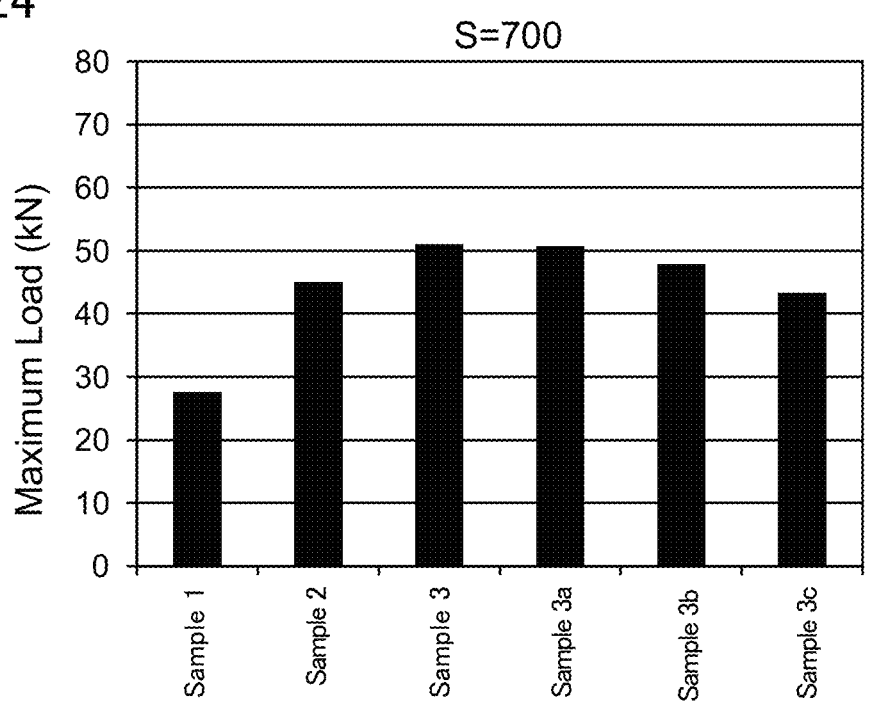
FIG. 24 is a graph to illustrate another example of results of Example 2.

FIGS. 22 to 24 show simulation results when the inter-fulcrum distance S was 700 mm. FIGS. 22 to 24 are figures corresponding to FIGS. 11 to 13, respectively.

As shown in FIG. 23, sample of Inventive Example with an L-shape width of not less than 10 mm exhibited higher properties per unit mass compared to samples of Comparative Example. As shown in FIG. 24, the samples of Inventive Example with an L-shape width of not less than 10 mm exhibited a larger maximum value of load applied until a time point when the displacement amount was 20 mm compared to the samples of Comparative Example. Further, the samples of Inventive Example which had an L-shape width of not less than 15 mm exhibited higher properties in any test compared to Comparative Examples.

The results described so far indicate that the L-shape width is preferably not less than 5 mm, more preferably not less than 10 mm, and further preferably not less than 15 mm.

INDUSTRIAL APPLICABILITY

The present invention can be utilized for structural members for automobiles.

REFERENCE SIGNS LIST

100: Structural member
110: Press-formed product
111: Vertical wall portion
112: Top plate portion
113: Corner portion
114: Flange portion
120: Reinforcing member
121: First plate-like portion
122: Second plate-like portion
130: Additional member

The invention claimed is:

1. A structural member for an automobile being a bumper beam, a side sill, a center pillar, an A pillar, a roof rail, a door impact beam, a beltline reinforcement, or a roof arch, comprising:
   a press-formed product formed from one steel sheet; and
   a reinforcing member fixed to the press-formed product, wherein
   the press-formed product includes two vertical wall portions and a top plate portion linking the two vertical wall portions,
   the reinforcing member is a member which has an L-shaped cross section and includes a first plate-like portion and a second plate-like portion,
   the first plate-like portion of the reinforcing member is fixed to one of the vertical wall portions by at least one kind of fixing selected from the group consisting of welding, adhesive bonding, brazing, riveting, and friction stir joining, while the second plate like portion of the reinforcing member is maintained in a free state, such that the second plate-like portion protrudes from the vertical wall portion in a direction away from the top plate portion, a fixing portion between the first plate-like portion and the one of the vertical wall portions is provided at a position closer to the top plate portion than the end of the vertical wall portion, a cross section at a boundary between the vertical wall portion and the top plate portion has a rounded shape, and the second plate-like portion is disposed on a top plate portion side with respect to a starting position of the rounded shape in the vertical wall portion.

2. The structural member for an automobile according to claim 1, wherein
the reinforcing member is fixed only to the press-formed product.

3. The structural member for an automobile according to claim 1, wherein
when the structural member is projected in a direction perpendicular to a longitudinal direction of the press formed product and parallel with the top plate portion, a projection region of the reinforcing member lies in a range of a projection region of the press-formed product.

4. The structural member for an automobile according to claim 1, wherein
the reinforcing member is made of steel sheet.

5. The structural member for an automobile according to claim 1, further comprising
two of the reinforcing members, wherein
the reinforcing members are fixed respectively to the two vertical wall portions.

6. The structural member for an automobile according to claim 1, wherein
the press-formed product includes two flange portions that extend respectively from the ends of the two vertical wall portions,
the structural member further includes an additional member made of steel sheet,
the additional member is fixed to the two flange portions such that the press-formed product and the additional member constitute a closed cross section.

7. The structural member for an automobile according to claim 1, wherein
the reinforcing member and the press-formed product satisfy the following formula:

$$[\text{Sheet-thickness (mm) of the reinforcing member}] \times [\text{Tensile strength (MPa) of the reinforcing member}] \times 0.8 \geq [\text{Sheet-thickness (mm) of the press-formed product}] \times [\text{Tensile strength (MPa) of the press-formed product}].$$

8. The structural member for an automobile according to claim 1, wherein
a distance between the top plate portion and the second plate-like portion is 0 mm to 20 mm.

9. The structural member for an automobile according to claim 1, wherein
a radius of curvature of a corner portion between the first plate-like portion and the second plate-like portion of the reinforcing member is 5% to 50% of an entire length in a cross-sectional view of the reinforcing member.

10. The structural member for an automobile according to claim 1, wherein
when an entire length in a longitudinal direction of the press-formed product is denoted as L, the reinforcing member is provided in a region up to a distance of L/6 to both sides from a middle of the longitudinal direction of the press-formed product.

11. The structural member for an automobile according to claim 1, wherein
an angle formed by the first plate-like portion and the second plate-like portion is 70° to 120°.

* * * * *